(12) United States Patent
Labrèche et al.

(10) Patent No.: US 11,888,578 B2
(45) Date of Patent: *Jan. 30, 2024

(54) MODULAR CHANNELIZER

(71) Applicant: MacDonald, Dettwiler and Associates Corporation, Sainte-Anne-de-Bellevue (CA)

(72) Inventors: Oliver Labrèche, Saint-Laurent (CA); Michel Thériault, Boisbriand (CA); Pierre Talbot, Pierrefonds (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 6 days.

This patent is subject to a terminal disclaimer.

(21) Appl. No.: 17/890,701

(22) Filed: Aug. 18, 2022

(65) Prior Publication Data
US 2023/0060548 A1 Mar. 2, 2023

Related U.S. Application Data

(60) Continuation of application No. 17/084,066, filed on Oct. 29, 2020, now Pat. No. 11,424,822, which is a division of application No. 15/729,257, filed on Oct. 10, 2017, now Pat. No. 10,855,366.

(51) Int. Cl.
*H04B 7/204* (2006.01)
*H04J 4/00* (2006.01)
*H04B 7/185* (2006.01)

(52) U.S. Cl.
CPC ....... *H04B 7/2043* (2013.01); *H04B 7/18515* (2013.01); *H04B 7/2041* (2013.01); *H04J 4/00* (2013.01)

(58) Field of Classification Search
CPC .............. H04B 7/2043; H04B 7/18515; H04B 7/2041; H04J 4/00
See application file for complete search history.

(56) References Cited

U.S. PATENT DOCUMENTS

| | | | |
|---|---|---|---|
| 2002/0122408 A1* | 9/2002 | Mullins .............. | H04B 7/18539 370/347 |
| 2004/0028089 A1* | 2/2004 | Shake ..................... | H04J 14/08 370/542 |
| 2008/0311844 A1* | 12/2008 | Eidenschink ........ | H04B 7/2125 455/3.02 |
| 2012/0300960 A1* | 11/2012 | Mackay ................... | H04R 3/00 381/119 |

(Continued)

Primary Examiner — Luat Phung
(74) Attorney, Agent, or Firm — Own Innovation; Kent Howe; James W. Hinton

(57) ABSTRACT

An example of a channelizer includes a plurality of receiver circuits, an individual receiver circuit including a frequency demultiplexer that is configured to demultiplex a plurality of subchannels and a time-division demultiplexer coupled to the frequency demultiplexer, the time-division demultiplexer configured to time-division demultiplex the plurality of subchannels to provide a plurality of time-division outputs, an individual time-division output including portions of data from each of the plurality of subchannels; and a plurality of switch circuits, each configured to receive a different time-division output of the plurality of time-division outputs from the individual receiver.

19 Claims, 26 Drawing Sheets

(56) References Cited

U.S. PATENT DOCUMENTS

| | | | | |
|---|---|---|---|---|
| 2014/0036765 A1* | 2/2014 | Fujimura | ........... | H04B 7/18515 |
| | | | | 370/316 |
| 2015/0381266 A1* | 12/2015 | Fujimura | ........... | H04B 7/18513 |
| | | | | 370/318 |
| 2016/0057698 A1* | 2/2016 | Akita | ................... | H04B 7/1851 |
| | | | | 370/311 |

* cited by examiner

Field of Regard

Operation of Time Demux #1 (others similar)

Figure 16E
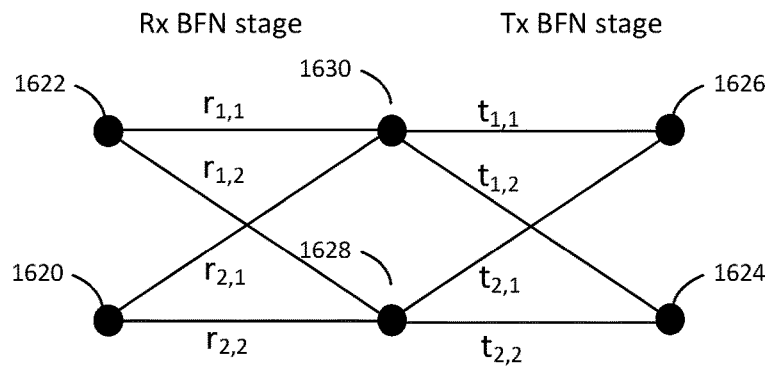
Rx BFN stage    Tx BFN stage
Figure 16F
Equivalent Transformation
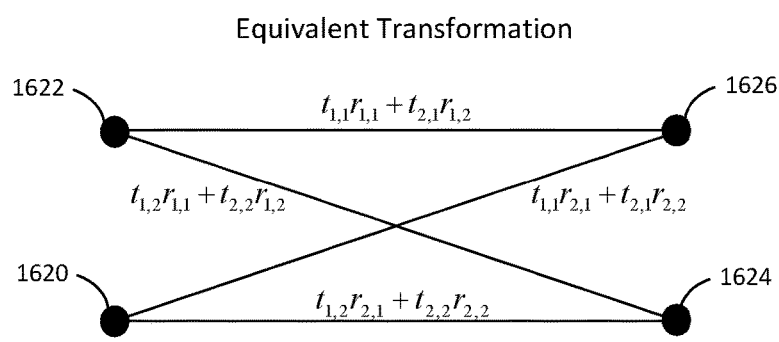
Figure 16G
$$A = \begin{bmatrix} t_{1,1} & t_{2,1} \\ t_{1,2} & t_{2,2} \end{bmatrix} \begin{bmatrix} r_{1,1} & r_{2,1} \\ r_{1,2} & r_{2,2} \end{bmatrix} = \begin{bmatrix} t_{1,1}r_{1,1} + t_{2,1}r_{1,2} & t_{1,1}r_{2,1} + t_{2,1}r_{2,2} \\ t_{1,2}r_{1,1} + t_{2,2}r_{1,2} & t_{1,2}r_{2,1} + t_{2,2}r_{2,2} \end{bmatrix}$$

Figure 20A
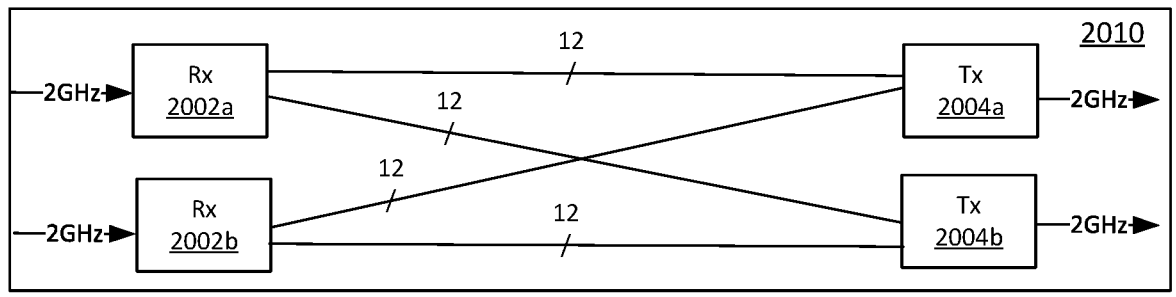
Figure 20B
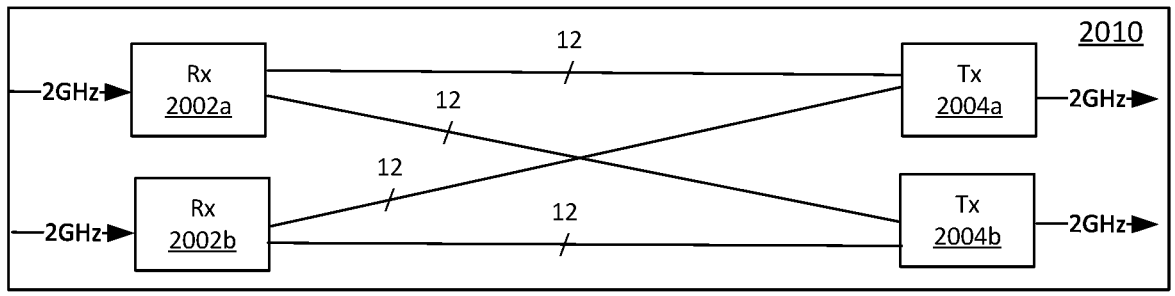
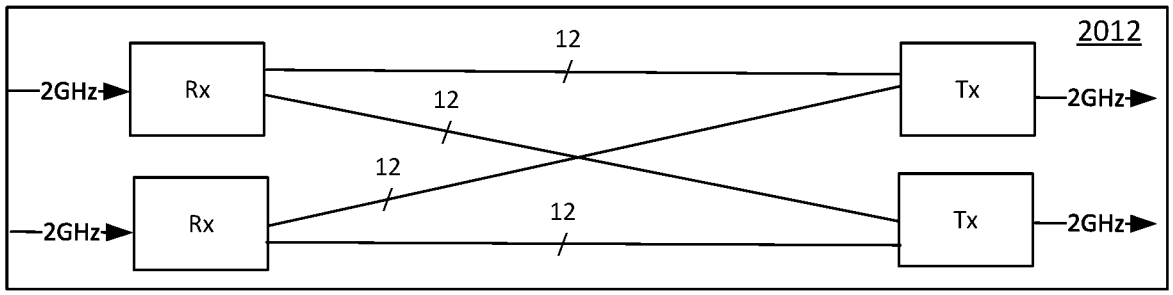

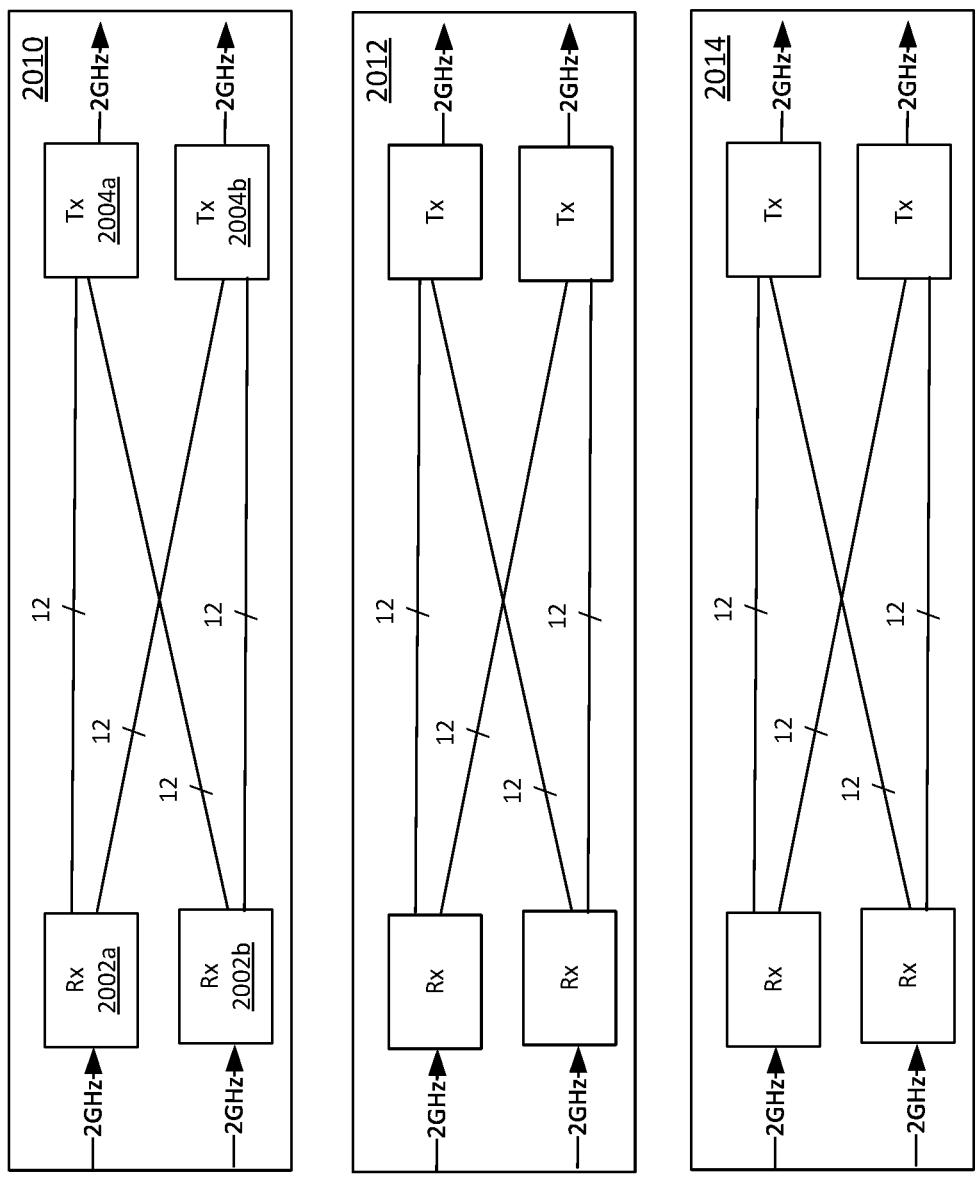

MODULAR CHANNELIZER

BACKGROUND

The present disclosure relates to technology for satellite communication systems.

Satellite communication systems typically include one or more satellites and a set of ground terminals. Such systems typically operate within regulations that allocate operating frequency bandwidth for a particular communications service and specify, among other things, a maximum signal power spectral density of communications signals radiated to the ground. A growing market exists for provision of high data rate communication services to individual consumers and small businesses which may be underserved by or unable to afford conventional terrestrial services. Satellite communication systems have been proposed to provide such high data rate communication services. In particular, satellites embedding digital telecommunications payloads can provide advanced features such as reconfigurable switching, beamforming or beam hopping with a high degree of flexibility. However, designing such a digital payload while maximizing on-orbit flexibility and minimizing costs and resources such as mass, power and size is a challenging task.

BRIEF DESCRIPTION OF THE DRAWINGS

FIGS. 16A-G illustrate examples of operation of a channelizer.

FIGS. 20A-D illustrate examples of direct connection between receiver circuits and transmit circuits.

DETAILED DESCRIPTION

System Overview

Figure 1:
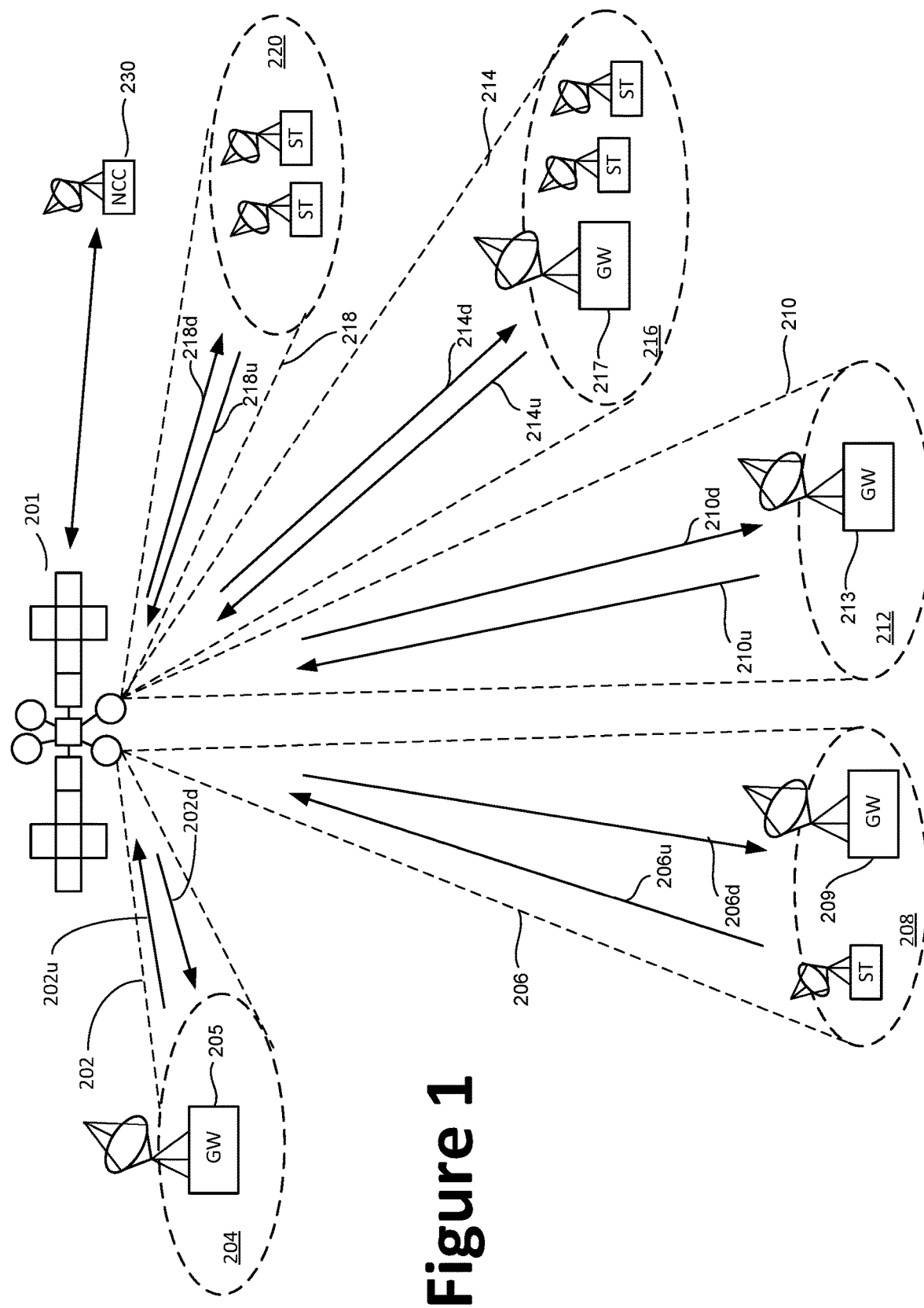
FIG. 1 is a block diagram describing one embodiment of a portion of a satellite communications system.

A satellite communication system may include a single or a constellation of geostationary or non-geostationary satellites orbiting the Earth, a plurality of gateways and a plurality of subscriber terminals (also referred to as terminals). The subscriber terminals communicate with the gateways or with other terminals via the satellites. The system can be used to provide access to the Internet or other network, telephone services, video conferencing services, private communications, broadcast services, as well as other communication services.

In general, each satellite provides a plurality of receive and transmit beams which may be formed by analog means such as non-articulated or steerable spot beam antenna, or by analog beamforming networks at the input or output sides of the satellite operating on antenna element signals. The entirety or portions of the spectrum covered by receive beams (receive sub-bands) are routed to the entirety or portions of the spectrum covered by transmit beams (transmit sub-bands). This routing is traditionally performed by analog means (bent pipe payloads). Alternatively, on-board processing can be used to flexibly assign receive sub-bands to transmit sub-bands using a digital channelizer system, which may or may not include beam hopping schemes. Additionally, the digital channelizer system may also be used to form the beams digitally, in which case it will receive as input an array of receive antenna element signals and output an array of transmit antenna element signals. Mixed operating modes are also possible where some of the beams are formed analogically and other beams are formed digitally. Any given beam may also be formed by a combination of analog and digital means (partial analog beamforming).

One example of a satellite communication system embedding a non-beamforming digital channelizer comprises one or more non-geostationary satellites. Each satellite provides a plurality of non-articulated spot beams that implement time domain beam hopping and a plurality of steerable spot beams for communicating with the gateways and subscriber terminals. The spot beams are divided into hopping groups and each satellite is configured to switch throughput and power among spot beams in a same hopping group at intervals of an epoch over a hopping period according to a hopping plan. While this scenario describes a system where the beams are generated via analog means, it is understood that similar systems may be devised where beamforming is integrated within a modular digital channelizer.

A modular channelizer allows data from a configurable number of receive modules (receive circuits) to be routed to a configurable number of switch modules (switch circuits), which route data to a configurable number of transmit modules (transmit circuits). The switch modules optionally integrate the circuits to implement digital beamforming, in which case they may also be referred to as "beamforming switch modules (beamforming switch circuits)". Thus, a receive stage, switching stage, and transmit stage are each modular and can be reconfigured. A receive module may include a frequency demultiplexer to generate input subchannels from an input and a time-division demultiplexer to demultiplex input subchannels by sample periods and provide different time-division outputs for different time periods. Note that the period of the time-division is unrelated to the beam hopping period (if applicable). The time-division outputs are distributed to switch modules by sample period. Switch modules may be allocated by sample periods so that each switch module switches data from all subchannels of all receive modules for its allocated sample period. Outputs from switch modules are specific to sample periods and are provided to time-division multiplexers in transmit modules that multiplex them into output subchannels. Output subchannels may be frequency multiplexed to provide outputs.

FIG. 1 is a block diagram depicting a portion of a satellite communications system that includes one or more satellites. FIG. 1 depicts satellite 201, which may be a geostationary satellite or a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments (as described below) the system will include multiple satellites that are referred to as a constellation of satellites.

In one embodiment, satellite 201 comprises a bus (i.e., spacecraft) and one or more payloads, including a communications payload. The satellite may also include multiple power sources, such as batteries, solar panels, and one or more propulsion systems, for operating the bus and the payload. The satellite includes an antenna system that provides a plurality of beams, including non-articulated and steerable spot beams, for communicating with subscriber terminals and gateways.

A subscriber terminal is a device that wirelessly communicates with a satellite, usually to be used by one or more end users. The term subscriber terminal may be used to refer to a single subscriber terminal or multiple subscriber terminals. A subscriber terminal is adapted for communication with the satellite communication system including satellite 201. Subscriber terminals may include fixed and mobile subscriber terminals including, but not limited to, a cellular telephone, wireless handset, a wireless modem, a data transceiver, a paging or position determination receiver, or mobile radiotelephone, a cellular backhaul, a trunk, an enterprise computing or storage device, an airborne device, a maritime device or a head end of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, a terminal or a mobile.

The term gateway may be used to refer to a device that communicates wirelessly with a satellite and provides an interface to a network, such as the Internet, a wide area network, a telephone network or other type of network. In some embodiments, gateways manage the subscriber terminals.

FIG. 1 also shows a Network Control Center 230, which includes an antenna and modem for communicating with satellite 201, as well as one or more processors and data storage units. Network Control Center 230 provides commands to control and operate satellite 201, as well as all other satellite communication payloads in the constellation. Network Control Center 230 may also provide commands to any of the gateways (via a satellite or a terrestrial network) and/or subscriber terminals.

In one embodiment, satellite 201 is configured to provide two hundred fixed (i.e., non-articulated so that they are fixed in relation to satellite 201) spot beams that use time domain beam hopping among the spot beams. In other embodiments, more or less than two hundred spot beams can be used for the time domain beam hopping. In one embodiment, the two hundred hopping beams are divided into thirty-six hopping groups such that one beam in each group is active at a given time; therefore, thirty-six of the two hundred spot beams are active at an instance in time. In addition to the two hundred non-articulated spot beams that perform time domain beam hopping, one embodiment of satellite 201 includes eight 4.2 degree steerable spot beams used to communicate with gateways. In other embodiments, more or less than eight can be used. Additionally, satellite 201 includes six 2.8 degree steerable spot beams which can have a dual purpose of communicating with gateways and/or providing high capacity communication for subscriber terminals that would otherwise fall under the hopping beams of the two hundred spot beams performing time domain beam hopping. Other embodiments can use different sized spot beams.

For example purposes only, FIG. 1 shows five spot beams: 202, 206, 210, 214 and 218. Spot beam 202 is a 4.2 degree steerable spot beam that illuminates coverage area 204 for communicating with one or more gateways 205 via downlink 202d and uplink 202u. Spot beam 206 is a 2.8 degree steerable dual-purpose beam that illuminates coverage area 208 in order to communicate with one or more gateways 209 and one or more subscriber Terminals ST via downlink 206d and uplink 206u. Spot beam 210 is a 2.8 degree steerable spot beam that could be used to communicate with gateways and/or subscriber terminals ST, but in the example of FIG. 1 spot beam 210 illuminates coverage area 212 to communicate with one or more gateways 213 via downlink 210d and uplink 210u. The two hundred spot beams that perform time domain beam hopping can be used to communicate with subscriber terminals and/or gateways. Spot beams 214 and 218 are two examples of the two hundred non-articulated spot beams that performed time domain beam hopping. Spot beam 214 illuminates coverage area 216 to communicate with one or more gateways 217 and one or more subscriber terminals ST via downlink 214d and uplink 214u. Spot beam 218 illuminates coverage area 220 to communicate with subscriber terminals ST via downlink 218d and uplink 218u.

Figure 2:
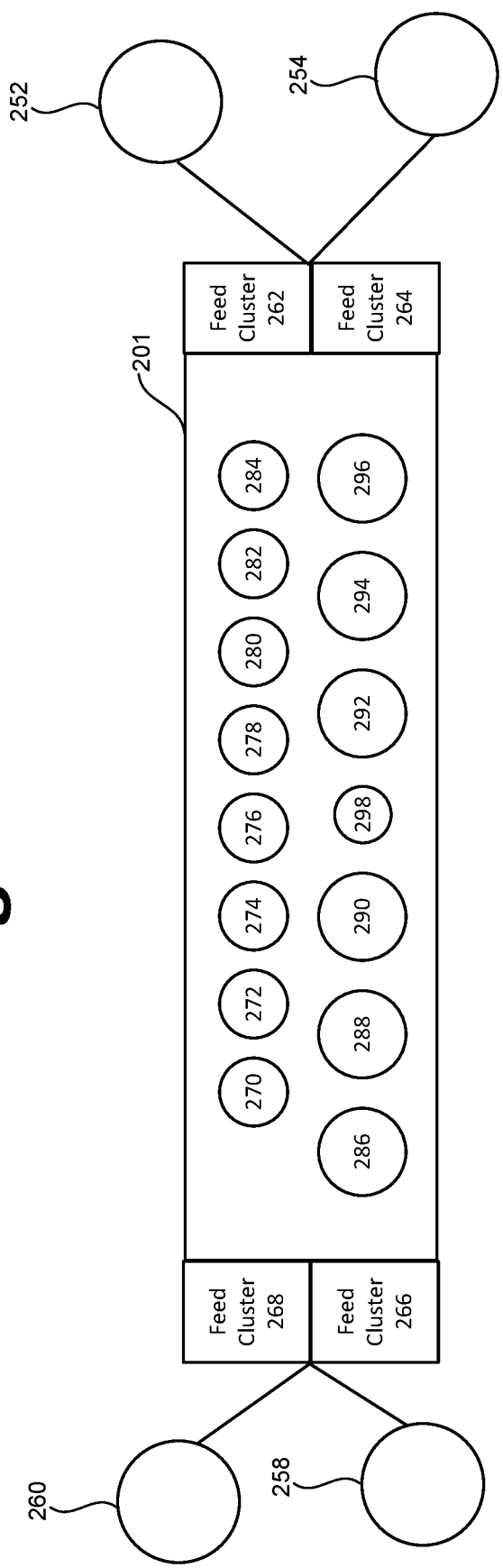
FIG. 2 is a block diagram depicting a satellite and its antenna system.

FIG. 2 is a block diagram depicting more details of one embodiment of an antenna system of satellite 201. For example, FIG. 2 shows antennas 252, 254, 258 and 260 which provide the two hundred spot beams that implement time domain beam hopping. Each of antennas 252, 254, 258 and 260 provide fifty spot beams each. FIG. 2 shows feed cluster 262 pointed at antenna 252, feed cluster 264 pointed at antenna 254, feed cluster 266 pointed at antenna 258 and feed cluster 268 pointed at antenna 260. Additionally, satellite 201 includes six 2.8 degree steerable antennas for communicating with gateways and/or providing high capacity beams for subscriber terminals, including antennas 286, 288, 290, 292, 294 and 296. Satellite 201 also includes eight 4.2 degree steerable antennas for communicating with gateways, including antennas 270, 272, 274, 276, 278, 280, 282 and 284. In one embodiment, the antennas are mechanically steerable. In another embodiment, a phased array or other means can be used to electronically steer the spot beams. Satellite 201 also includes an antenna 298 for communicating with network control center 230 in order to provide telemetry and commands to satellite 201, and provide status and other data back to network control center 230.

Antenna 298, or any of the other antennas, can also be used to provide a beacon signal. In some embodiments, satellite 201 can include an additional antenna for providing the beacon signal. In traditional satellites, the beacon signal provides subscriber terminals and gateways with a gauge to determine how much power should be used. A terminal on the ground can transmit a signal which the satellite will use to generate a corresponding downlink, which can then be compared to the strength of the beacon signal, and then can adjust its power up or down to match the beacon signal. The beacon signal can also be used to determine when a satellite is not operational. Additionally, beacon signals can be used to compensate for Doppler shift. Since the terminals knows the beacon is supposed to be on a certain frequency, it can calculate its Doppler based on the current reception of the beacon signal.

Figure 3:
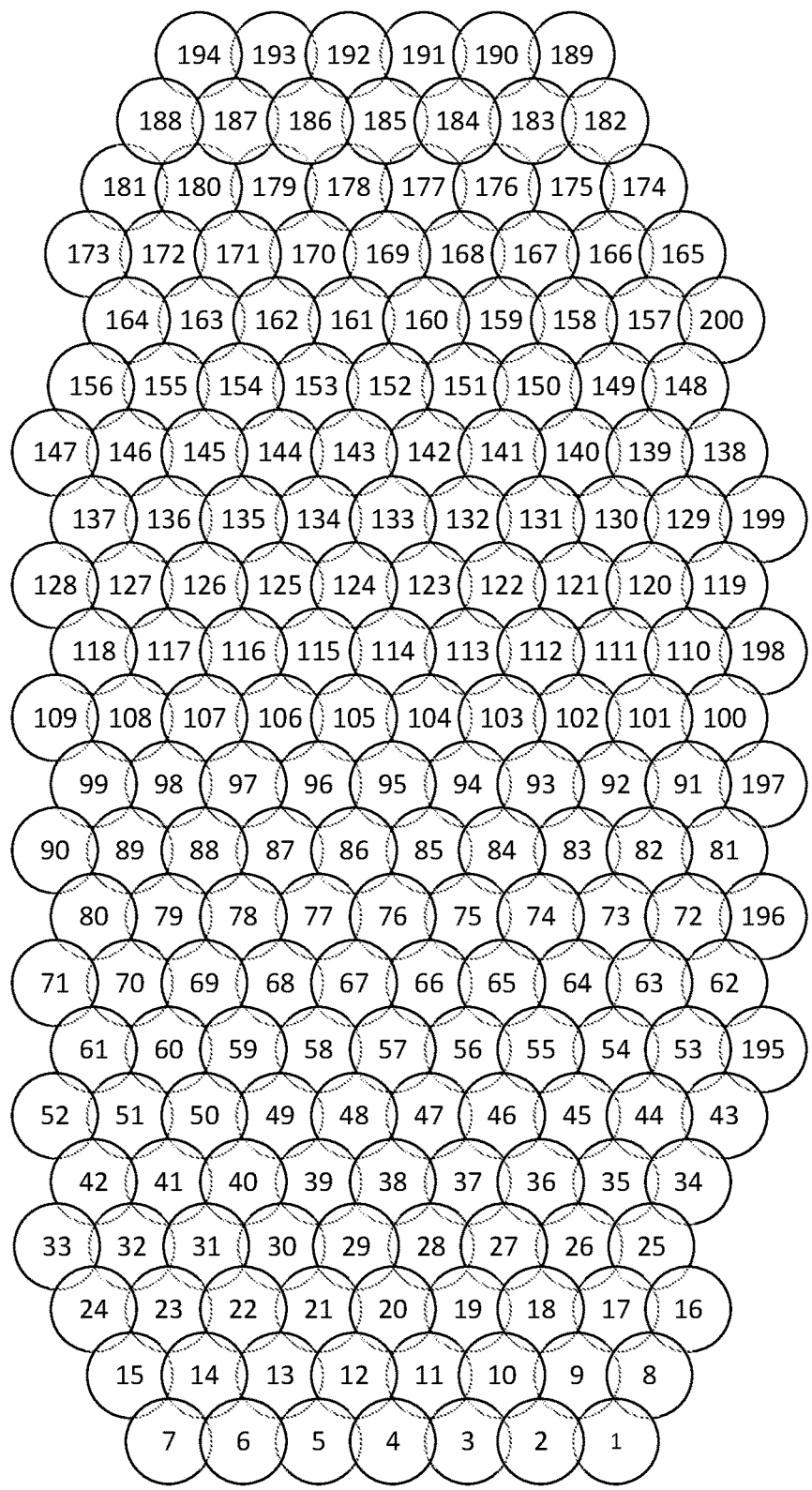
FIG. 3 depicts a beam map for a Field of Regard.

FIG. 3 provides an example beam map for the two hundred non-articulated spot beams of satellite 201 that implement time domain beam hopping. In one embodiment, those spot beams are fixed in direction, relative to satellite 201. As can be seen, the two hundred spot beams depicted in FIG. 3 are numbered 1-200. In one embodiment, the spot beams overlap; for example, the −5 dB contour of each spot beam overlaps with the −5 dB contour of other spot beams neighboring it. All the spot beams together comprise the Field of Regard of satellite 201. The Field of Regard of the satellite is different than the Field of View of the satellite. For example, the Field of Regard is the target area that the satellite can see/communicate based on its position. Thus, the entire beam map of FIG. 3 is the Field of Regard. In contrast, the Field of View is the area that the satellite's payload can actually see at an instance in time. For example, when performing time domain beam hopping, only a subset of those spot beams depicted in FIG. 3 are active at a given time. Therefore, the Field of View is less than the Field of Regard.

Figure 4:
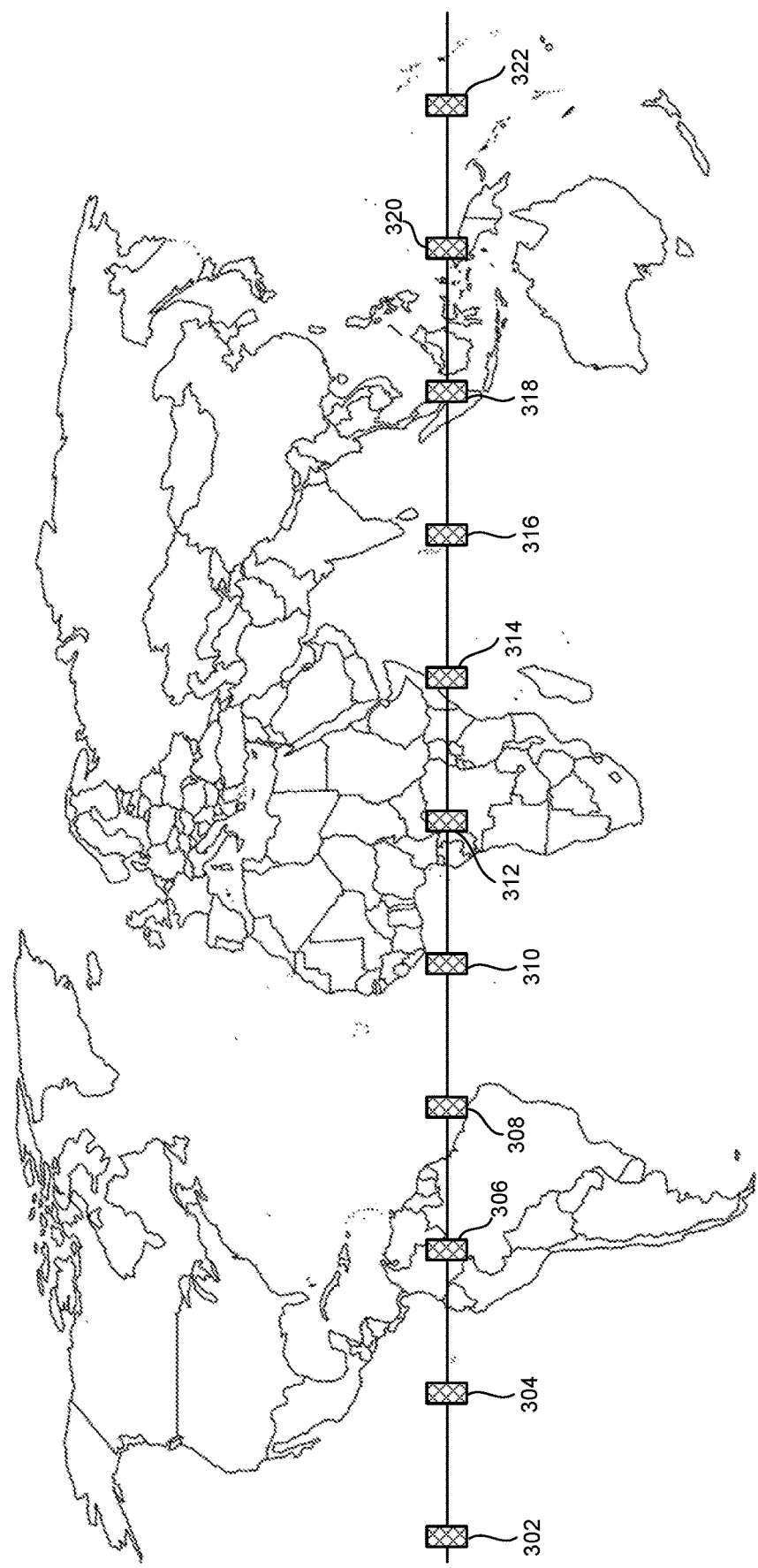
FIG. 4 is a map of the world, showing a constellation of non-geostationary satellites.

In one embodiment, satellite 201 is only one satellite of a larger constellation of satellites that implement the satellite communication system. In one example embodiment, the satellite constellation includes eleven satellites, with each satellite having the same structure as satellite 201. However, each of the satellites can be independently programmed to implement the same or different time domain beam hopping plans, as will be explained below. FIG. 4 is a map of the world showing eleven MEO satellites 302, 304, 306, 308, 310, 312, 314, 316, 318, 320, and 322. In one embodiment, all eleven satellites are in orbit about the Equator. In one example, all eleven satellites are moving in the same orbital direction along the same orbital path and are equally spaced apart from each other. Because the satellites are in MEO orbit, they are non-geostationary, meaning that they will move with respect to any location on the Earth. As the satellites move in orbit, the user and gateway spot beams' coverage areas will drift across the Earth's surface with the satellites. In one example, there will be a drift rate of 360 degrees longitude every six hours, or one degree per minute. In such embodiment, each satellite will orbit past the same earth position in six hours, or four times a day. In one embodiment, the time it takes to drift the width of a spot beam covering subscriber terminals (one of the two hundred beam hopping spot beams) is approximately 2.8 minutes (168 seconds).

Figure 5:
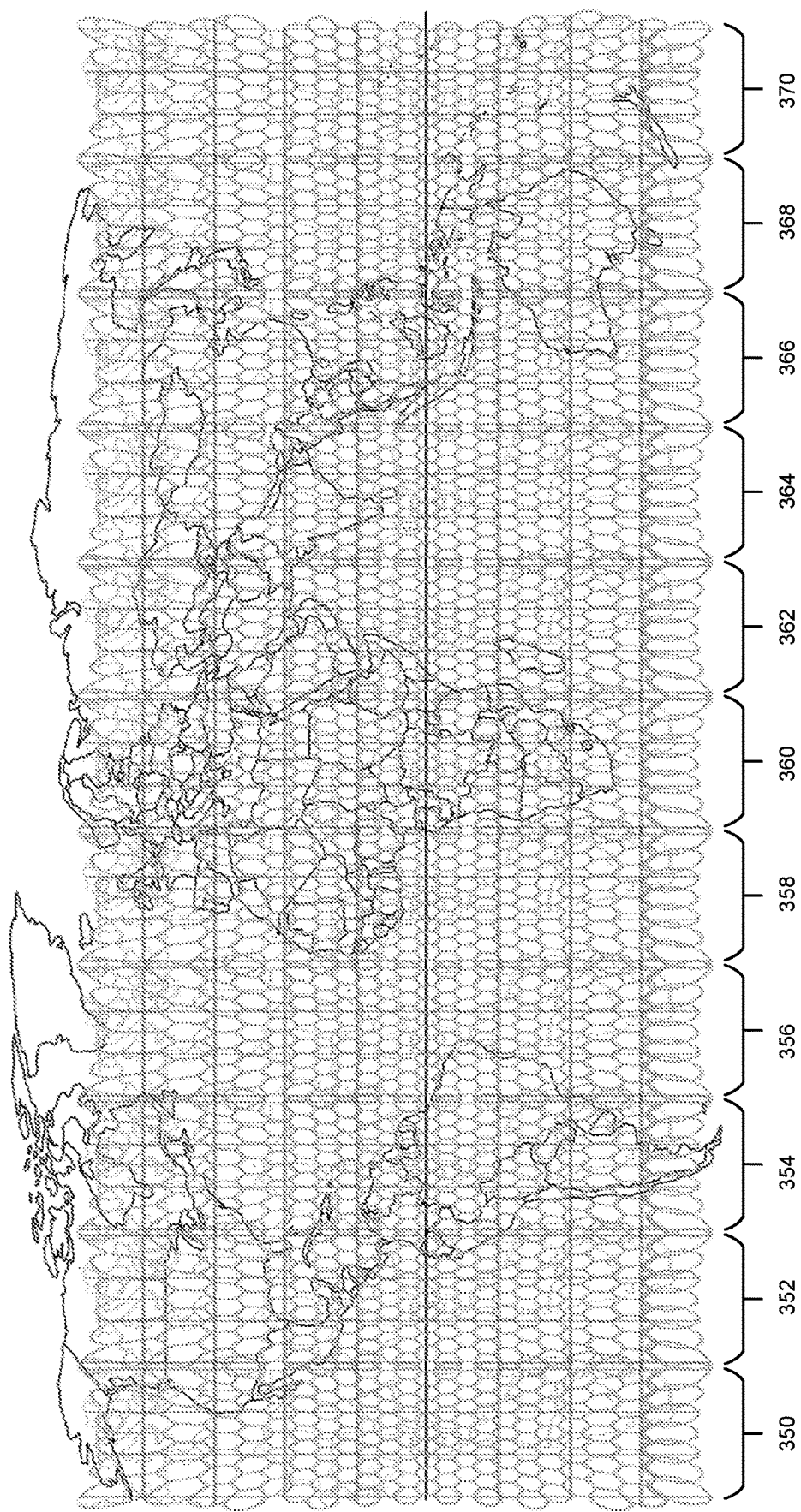
FIG. 5 is a map of the world, showing the beam maps for eleven non-geostationary satellites.

FIG. 5 shows the same map of the world as FIG. 4, with the beam maps (the Field of Regard) for each of the satellites depicted over the map. For example, satellite 302 projects beam map 350, satellite 304 projects beam map 352, satellite 306 projects beam map 354, satellite 308 projects beam map 356, satellite 310 projects beam map 358, satellite 312 projects beam map 360, satellite 314 projects beam map 362, satellite 316 projects beam map 365, satellite 318 projects beam map 366, satellite 320 projects beam map 368, and satellite 322 projects beam map 370. Note that the satellites 302-322 are constantly moving west to east; therefore, beam maps 350-370 are also moving west to east, and are never stationary (in one embodiment). As can be seen, adjacent satellites have adjacent beam maps and adjacent Fields of Regard when operating the satellites. In one embodiment, the beam maps of adjacent satellites overlap so that among the constellation's satellites there is continuous coverage around the globe; however, there may be gaps in coverage at the north and south poles (where there is little demand). That is, the beam map of each satellite is adjacent to a beam map on the adjacent satellite to provide a composite beam map that circumnavigates the Earth.

Figure 6:
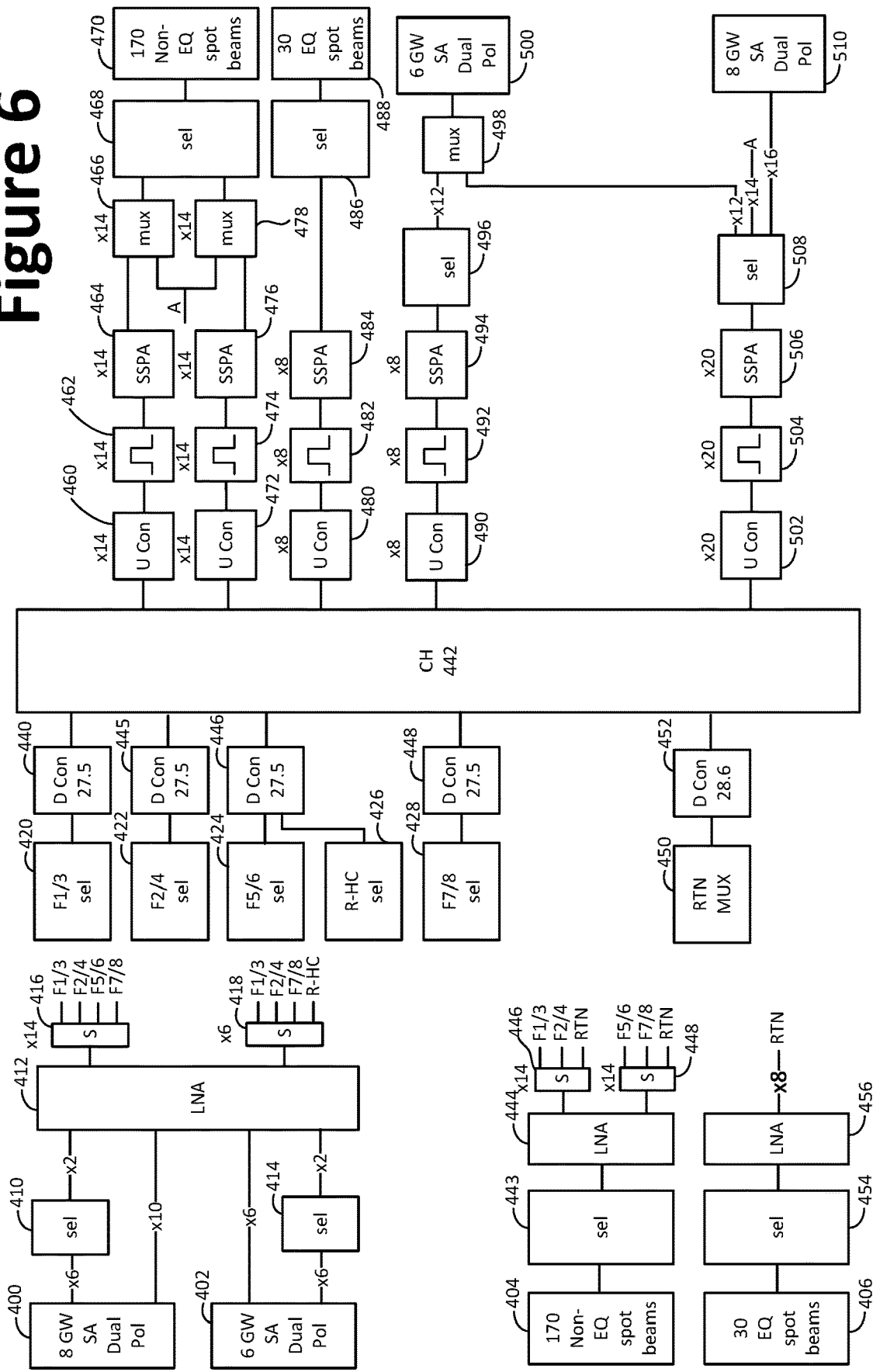
FIG. 6 is a block diagram of one embodiment of a communications payload for a non-geostationary satellite.

FIG. 6 is a block diagram of one embodiment of a communications payload for non-geostationary satellite such as satellite 201. In one embodiment, each of satellites 302-322 implement the same structure and design of satellite 201; therefore, the payload (e.g. apparatus of FIG. 6) will be implemented on each of satellites 302-322. Traditionally, the communications path from the gateway to the subscriber terminal via the satellite is referred to as the forward path and the communications path from the subscriber terminals to the gateway via the satellite are referred to as the return path. When a satellite is used to provide connectivity to the internet, a user at a computer connected to a subscriber terminal will send a request for content on the Internet to the gateway via the satellite, and the gateway will provide, in response to that request, access onto the Internet. The response from the Internet will be provided to the gateway, and then forwarded onto the subscriber terminal via the satellite.

The structure of FIG. 6 implements both the forward path and the return path. The uplink beams are received at the left-hand portion of the components of FIG. 6 and the downlink beams are provided at the right-hand edge of the components of FIG. 6. For example, FIG. 6 shows eight gateway steerable dual polarization antennas 400 and six gateway/high capacity subscriber terminal steerable antennas 402 with dual polarization for receiving uplink beams. FIG. 6 also shows the two hundred non-articulated spot beams divided into two groups: one hundred and seventy spot beams 404 illuminating areas away from the Equator and thirty spot beams 406 illuminating areas at the Equator.

The eight 4.2 degree gateway steerable spot beams 400 provide sixteen signals, eight in each polarization (left hand/right hand or horizontal/vertical). Six of those sixteen signals are provided to selection matrix 410 which includes a set of switches that selects two of the six input signals and provides those two selected signals to low noise amplifier 412. Ten of the 16 dual polarization signals from antennas 400 are applied directly to low noise amplifier bank 412 comprising low noise amplifiers. Note that the antennas 400 of FIG. 6 correspond to antennas 270-284 of FIG. 2. Similarly, antennas 402 of FIG. 6 correspond to antennas 286-296 of FIG. 2. The six gateway steerable antennas 402 provide 12 signals (six signals in two polarizations). Six of those signals are provided directly to low noise amplifier bank 412, the other six signals are provided to a 6:2 selection matrix 414, which chooses two of the signals to provide to low noise amplifier bank 412. Note that the satellite payload will include a processor (not depicted) which controls each of the selection matrices described herein. Alternatively, satellite bus will include a processor that will control the selection matrices. As described above, low noise amplifier bank 412 has 20 input signals and, therefore has 20 output signals. Fourteen of the signals output from low noise amplifier bank 412 are provided to separate splitters 416. That is, there are 14 splitters 416. Each splitter splits the incoming signal into four copies noted as: F1/3, F2/4, F5/6 and F7/8. The other six outputs from LNA 412 are provided to a different set of splitters 418 that split the signal to four copies labeled as: F1/3, F2/4, F7/8 and R-HC. The seven outputs of the splitter that started with an F are part of the forward path. The one output of the splitter 418 that is labeled R-HC is part of the return path from a steerable high capacity spot beam used to connect to subscriber terminals. In one embodiment splitters 416 and 418 include filters for passing the frequency bands of the labeled output and stopping all other frequencies.

After the splitters 416 and 418, the signals are sent to appropriate matrices 420, 422, 424, 426 and 428 in order to select which bands to use. Selection matrix 420 receives the signal F1/3. Selection matrix 422 receives signal F2/4. Selection matrix 424 receives signal F5/6. Selection matrix 426 receives signal R-8C. Selection matrix 428 receives F7/8. Eleven signals of the output of selection matrix 420 are provided to down converter 440, which provides its output to channel 442. The 11 signals of the output of selection matrix 422 are provided to down converter 445, which provided its output to channelizer 442. The output of selection matrix 424 includes seven signals that are provided to down converter 446, which provides its output to channelizer 442. The output of selection matrix 426 includes six signals that are provided to down converter 446, which provides its output to channelizer 442. The output of selection matrix 428 includes 11 signals that are provided to down converter 448, which provides its output to channelizer 442. Each of the selection matrices includes a series of programmable switches to route a subset of inputs to the output ports.

The one hundred and seventy non-Equatorial spot beams 404 are provided to selection matrix 443 which chooses twenty-eight out of the one hundred and seventy spot beams. That is, one beam from each of 28 beam hopping groups (discussed below) is chosen. Those 28 signals are sent to low noise amplifier 444. Half of the signals output from low noise amplifier 444 are provided to splitters 446. The other half of the signals are provided to splitters 448. Each of the fourteen splitters 446 make three copies of the signal and output those three copies as F1/3, F2/4 and RTN. Each of the fourteen splitters 448 make three copies of their respective incoming signals and output them F5/6, F7/8 and RTN. Note that the signals F1/3, F2/4, F5/6 and F7/8 are part of the forward path representing communication from a gateway in one of the one hundred and seventy hopping beams. The signal RTN is part of the return path, from subscriber terminals. Note that in some embodiments, each of the splitters has appropriate band pass filters. In some embodiments, each of the selection matrices has appropriate band pass filters at respective inputs and/or outputs.

FIG. 6 shows the thirty non-articulated beam hopping spot beams near the Equator being provided to selection matrix 454. The eight selected signals are provided to low noise amplifier 456 which outputs a signal labeled RTN. Note in some embodiments, each of the low noise amplifiers 456, 444 and 412 have band pass filters at their input and/or output. Additionally, band pass filters can be used at each of the antennas 400, 402, 404 and 406. Based on the output of splitters 448 and low noise amplifier 456, thirty-six signals labeled RTN are frequency combined in MUX 450 which outputs 9 signals. The output of MUX 450 is provided to down converter 452. The output of down converter 452 is provided to channelizer 442. Each of the selection matrices 410, 414, 420, 422, 424, 426, 428, 443 and 454 includes switches that are used to switch throughput among the various spot beams in the hopping groups or among various bands from the gateways and high capacity steerable spot beams. The chosen signals are provided to channelizer 442 which is used to route spectrum between the uplinks and downlinks. In one embodiment, channelizer 442 is a digital channelizer that is fully programmable in orbit. More details of channelizer 442 are provided below with respect to FIG. 7. Channelizer 442 can be thought of as a giant switching or routing matrix that is fully programmable. FIG. 6 shows that channelizer 442 provides fourteen outputs to upconverter 460, fourteen outputs to upconverter 472, eight outputs to upconverter 480, eight outputs to upconverter 490 and twenty outputs to upconverter 502. Note that upconverters 460, 472, 480 and 490 (all which function to increase the frequency of the signal) are provided as part of the forward path, while upconverter 502 is provided for the return path. The output of each of the 14 up converters 460 are provided to filters 462. The output of each of the fourteen filters 462 are provided to solid state power amplifiers (SSPA) 464. The output of each of the fourteen SSPAs are provided to multiplexer 466. The output of multiplexer 466 is provided to 28:170 selection matrix 468. The 170 outputs of selection matrix 468 are provided as the one hundred and seventy non-Equatorial non-articulated beam hopping spot beams 470.

The output of the fourteen upconverters 472 are provided to separate filters 474. The output of each of the fourteen filters 474 is provided to separate SSPAs 476. The output of each of the fourteen SSPAs 476 are provided to multiplexer 478. The output of multiplexer 478 is provided to selection matrix 468. The output of the eight upconverters 480 are provided to filters 482. The output of the eight filters 482 are provided to separate SSPAs 484. The output of SSPAs 484 are provided to selection matrix 486. The output of selection matrix 486 is provided as the thirty Equatorial region non-articulated beam hopping spot beams of 488. Note that the SSPAs can be turned off (e.g., when the satellite is over the ocean or other non-inhabited area) to conserve power.

The output of upconverters 490 (which can be part of the forward path or the return path) are provided to filters 492. The output of the eight filters 492 are provided to SSPAs 494. The output of the eight SSPAs 494 are provided to selection matrix 496. The 12 output signals from selection matrix 496 are provided to multiplexor 498. The output of multiplexor 498 are provided as the six 2.8 degree gateway/high capacity subscriber terminals steerable spot beams, with dual polarization.

The output of upconverters 502 are provided to separate filters 504. The output of the twenty filters 504 are provided to separate SSPAs 506. The output of the 20 SSPAs 506 are provided to selection matrix 508, which provides 42 outputs. Twelve of the 42 outputs are provided to multiplexer 498, fourteen of the 42 outputs are provided to multiplexer 466 and multiplexer 478, and sixteen of the 42 outputs are provided as the eight gateway steerable dual polarization spot beams described above.

In an alternative embodiment, many or all of the selection matrices can be eliminated by having the selection/switching performed by channelizer 442. In some embodiments, the payload of FIG. 6 can be fully implemented by just a channelizer that will switch, route and filter. Such a channelizer may be configurable for a range of different conditions so that a generic channelizer may be configured for a given application. For example, a channelizer may be configurable to route a relatively large number of low-capacity communication channels or a relatively small number of high-capacity communication channels. Furthermore, such a channelizer may, in some cases, be configurable to implement a beamforming scheme, e.g. to provide outputs to phased array elements to produce a beam that is oriented in a particular direction. Such a channelizer may provide additional flexibility and may reduce the hardware complexity with respect to the baseline system.

Figure 7:
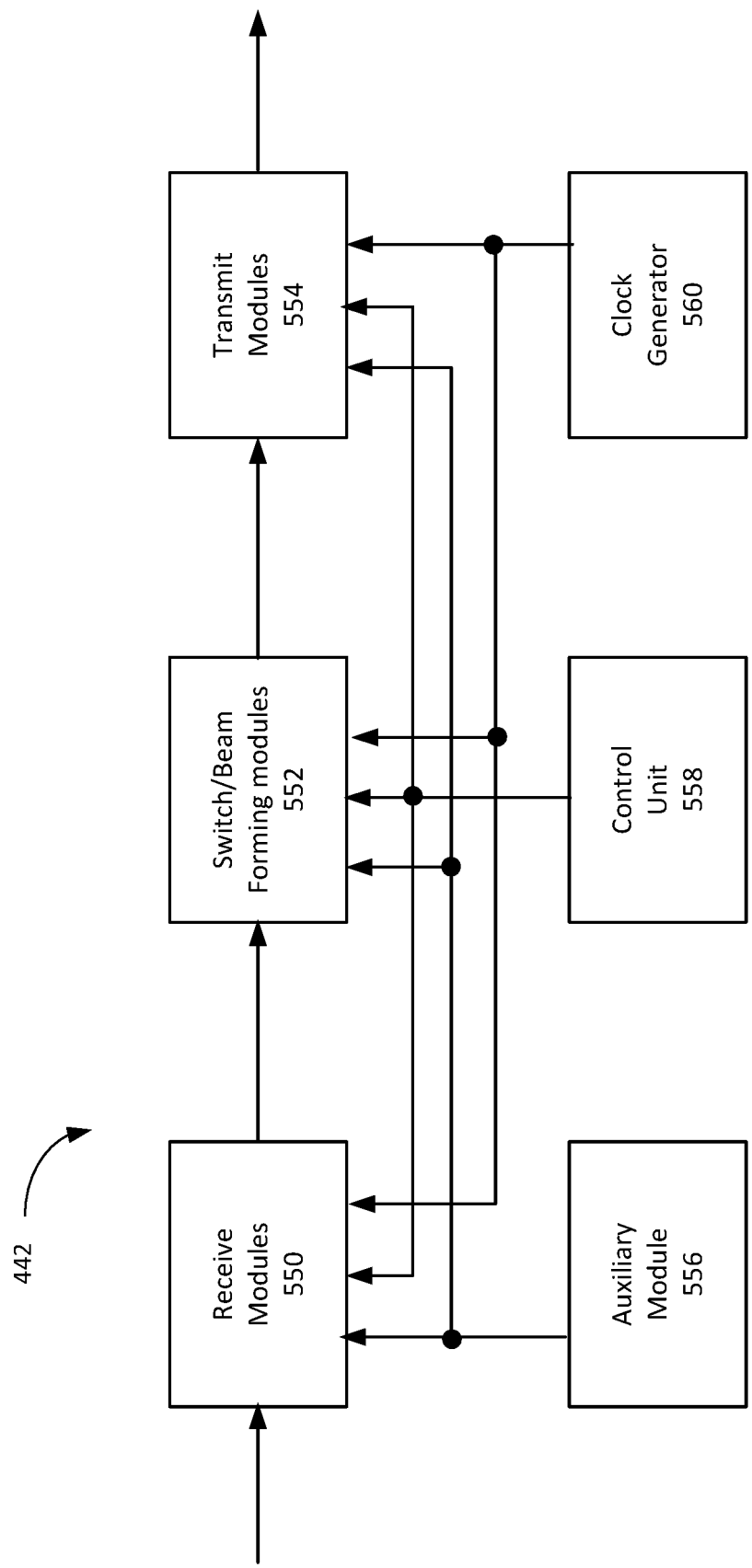
FIG. 7 is a block diagram of one embodiment of a digital channelizer.

FIG. 7 is a block diagram describing one example implementation of channelizer 442. The technologies described herein are not limited to any one particular architecture or implementation of channelizer 442. The embodiment of FIG. 7 is only one example that is suitable for the technology described herein and many other configurations are also usable. Inputs to channelizer 442 are provided to a receive module 550 (or "receive circuit"), where signals can be filtered, amplified, stored or simply received. The output of receive module 550 is provided to switch network and beam forming network 552. The output of switch network and beam forming network 552 is provided to a transmission module 554 which provides the outputs of channelizer 442. Channelizer 442 also includes an auxiliary module 556, control unit 558 and clock generator 560, which are all connected to receive module 550, switch network/beam forming network 552 and transmission module 554. In one embodiment, control unit 558 includes one or more processors used to program the switch networks/beam forming network 552. Clock generator 560 provides a clock signal to implement timing within channelizer 442. In one embodiment, auxiliary module 556 is used to control the switches of the switching network, adjust beams, provide spectrum analysis and provide uplink and downlink modems.

Figure 8:
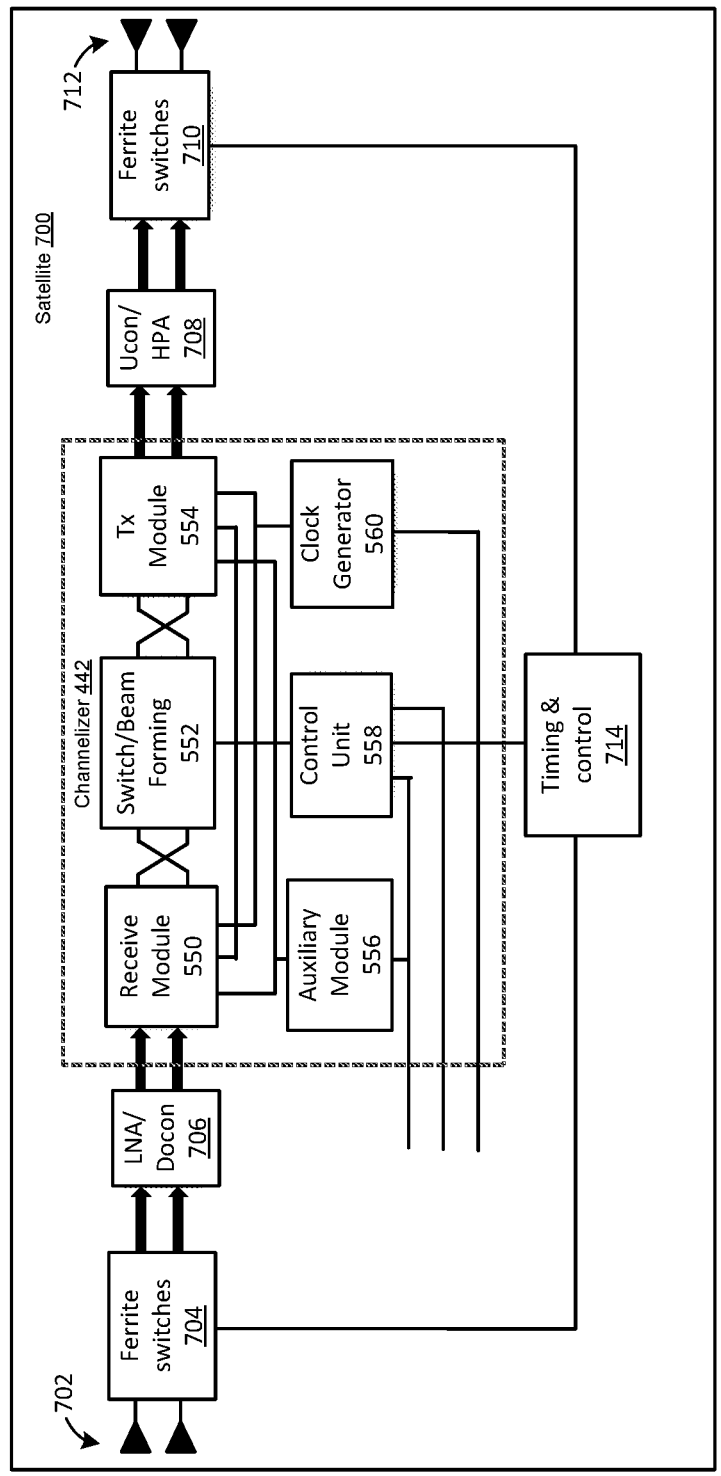
FIG. 8 is a block diagram of a satellite containing a digital channelizer.

FIG. 8 is a block diagram similar to FIG. 7, showing how channelizer 442 may be integrated with other components in a satellite 700. Antennas 702 may be multibeam uplink antennas that receive RF communications from one or more gateways and sent RF communications back to one or more gateways. Ferrite switches 704 provide high-speed switching of RF signals between individual beams generated by antennas 702. Low noise amplifier (LNA) and downconverter 706 amplifies RF signals from ferrite switches 704 and reduces RF frequency before sending RF signals to receive module 550 of channelizer 442. At the output side (right side) of channelizer 442, upconverter/high power amplifier (HPA) 708 receives output from transmission module 554. Upconverter/HPA 708 increases RF frequencies and amplifies RF signals, which are then sent to ferrite switches 710. Ferrite switches 710 switch RF signals between individual beams of antennas 712. Antennas 712 may be multibeam downlink antennas that direct RF signals to subscriber terminals. For example, antennas 712 may include multiple spot beam antennas configured for beam hopping and/or phased array elements configured to implement beamforming. Timing and control unit 714 provides a clock signal to ferrite switches 704, channelizer 442 and ferrite switches 710. This allows synchronization between these components so that channelizer 442 routes data in synchronization with switching by ferrite switches 704, 710.

While FIG. 8 shows receive module 550 in block form, it will be understood that receive module 550 may include multiple components. For example, receive module 550 may include multiple input ports that receive inputs from different beams and/or antennas and may include circuits related to receiving and processing such data (e.g. filters, sampling circuits, etc.), which may be referred to as "receivers" or "receive modules" and may be shared by input ports. Similarly, while transmission module 554 is shown in block form, transmission module 554 may include multiple output ports that provide outputs to different beams and/or antennas and may include circuits related to processing and transmitting such data (e.g. amplifiers, multiplexers, etc.), which may be referred to as "transmitters" or "transmit modules" and may be shared between output ports. In general, switch network and beam forming network 552 directs received data from input ports of receive module 550 to output ports of transmission module 554 under the direction of control unit 558. Specifically, control unit 558 may use routing and beamforming tables to direct data traffic through switching network and beam forming network 552. Routing tables may link input ports to output ports, receive beams to transmit beams, receive beams to output ports or input ports to transmit beams, where the receive beams and transmit beams are digitally formed within the channelizer system. Beamforming tables may specify the receive and transmit beamforming operations, including the gain and phase factors to apply to each subchannel. In some cases, an individual input port may support multiple subchannels so that input received on such an input port is divided into subchannels that may then be separately routed (i.e. subchannels received at the same input port may be routed to different output ports) or beamformed. Such routing and beamforming may be quite complex when there are large numbers of subchannels per input port and a large number of input and output ports. This can result in large routing and beamforming tables that require significant storage space. In some cases, routing and beamforming tables may be merged or partitioned into sub-operations and stored as lower-level commands or configurations in within modules 550, 552 and 554.

Figure 9A:
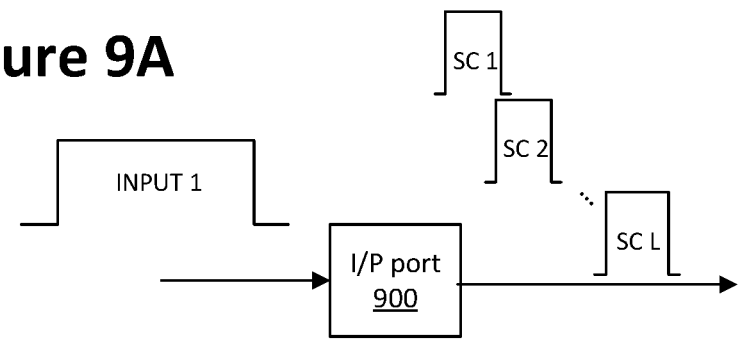
FIGS. 9A-D illustrate operation of an input port of a channelizer.

FIG. 9A shows how an input port 900 (e.g. an input port in an individual receive circuit such as in receive module 550 of FIGS. 7 and 8) may support multiple subchannels. The term "input port" is used here to refer to the physical connecting structure (e.g. physical port including multiple electrical conductors arranged to connect with an external component such as an antenna) and related receiver circuits. RF input is received by input port 900 as Input 1, e.g. from an RF uplink from a ground station received by an antenna. Input 1 may have a wide bandwidth that is split up by input port 900 into subchannels SC_1-SC_L, which have narrower bandwidths. Thus, for example, where Input 1 has a bandwidth of 100 MHz, M may be 100, and each subchannel SC_1-SC_L may have a bandwidth of 1 MHz, or L may be 200 and each subchannel SC_1-SC_L may have a bandwidth of 0.5 MHz. An input such as Input 1 may be divided by filtering selectively to isolate each desired bandwidth. Additionally, input port 900 may sample signals for each subchannel to provide SC_1-SC_L as digital samples.

Figure 9B:
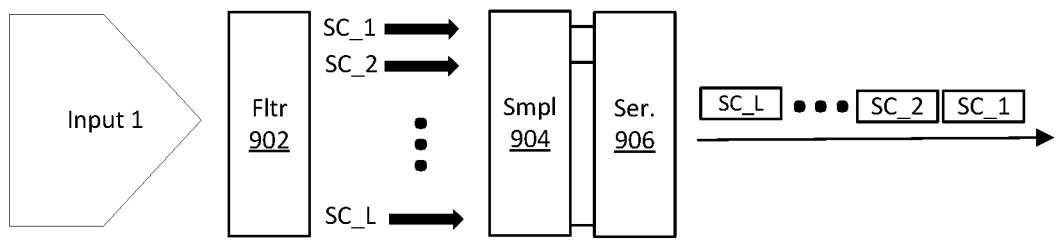

FIG. 9B provides a conceptual illustration of some operations of an input port such as input port 900. While FIG. 9B shows filtering followed by sampling, in some examples data is first digitized and then filtered. Input 1 is received and is filtered by an array of filters 902 into subchannels SC_1-SC_L according to frequency, i.e. array of filters 902 divides Input 1 into L subchannels of different frequencies. Sampling circuits 904 sample the subchannels SC_1-SC_L to provide digital output representing each subchannel at a sampling time to serializer 906, which converts parallel samples to a serial stream. The digital output may be provided in serial form as shown. Thus, while sampling of all subchannels may occur in parallel, sampled data from different subchannels may be output in series. This may be reversed by an output port where different subchannels may be multiplexed.

Figure 9C:
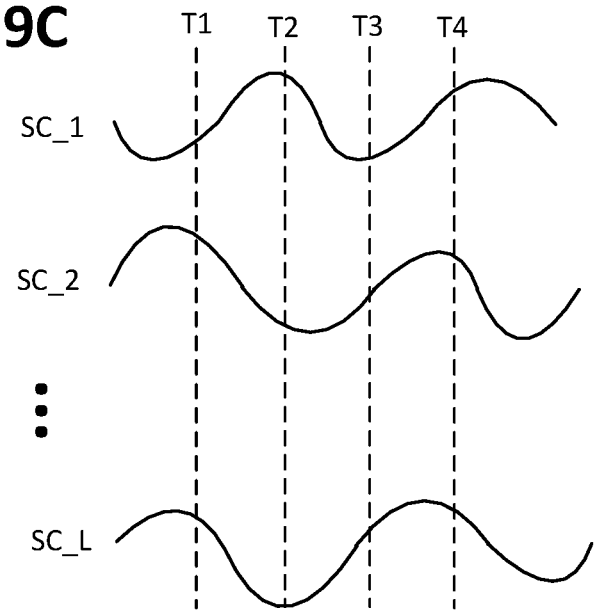

FIG. 9C illustrates an example of how subchannels SC_1 to SC_L may be sampled at a series of sampling times T1-T4. A set of subchannel samples for a given sampling time may be referred to as a "frame" so that the data obtained from subchannels SC_1-SC_L at time T1 may be considered samples of a first frame, data obtained from subchannels SC_1-SC_L at time T2 may be considered samples of a second frame, data obtained from subchannels SC_1-SC_L at time T3 may be considered samples of a third frame, and so on. Frame data may be sent sequentially in the same order in which sampling occurs and data within a frame may be sent sequentially also (e.g. as illustrated in FIG. 9B). For example, sampled data of a frame may be buffered in parallel and then read out in series. Sampling of RF signals to provide digital samples may be considered a form of analog-to-digital conversion with subsequent processing of digital samples in the channelizer being digital so that a switching network in such a channelizer may be digital.

Figure 9D:
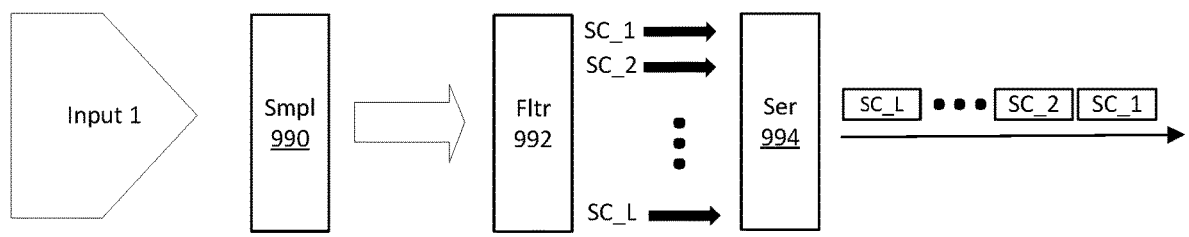
Figure 10:
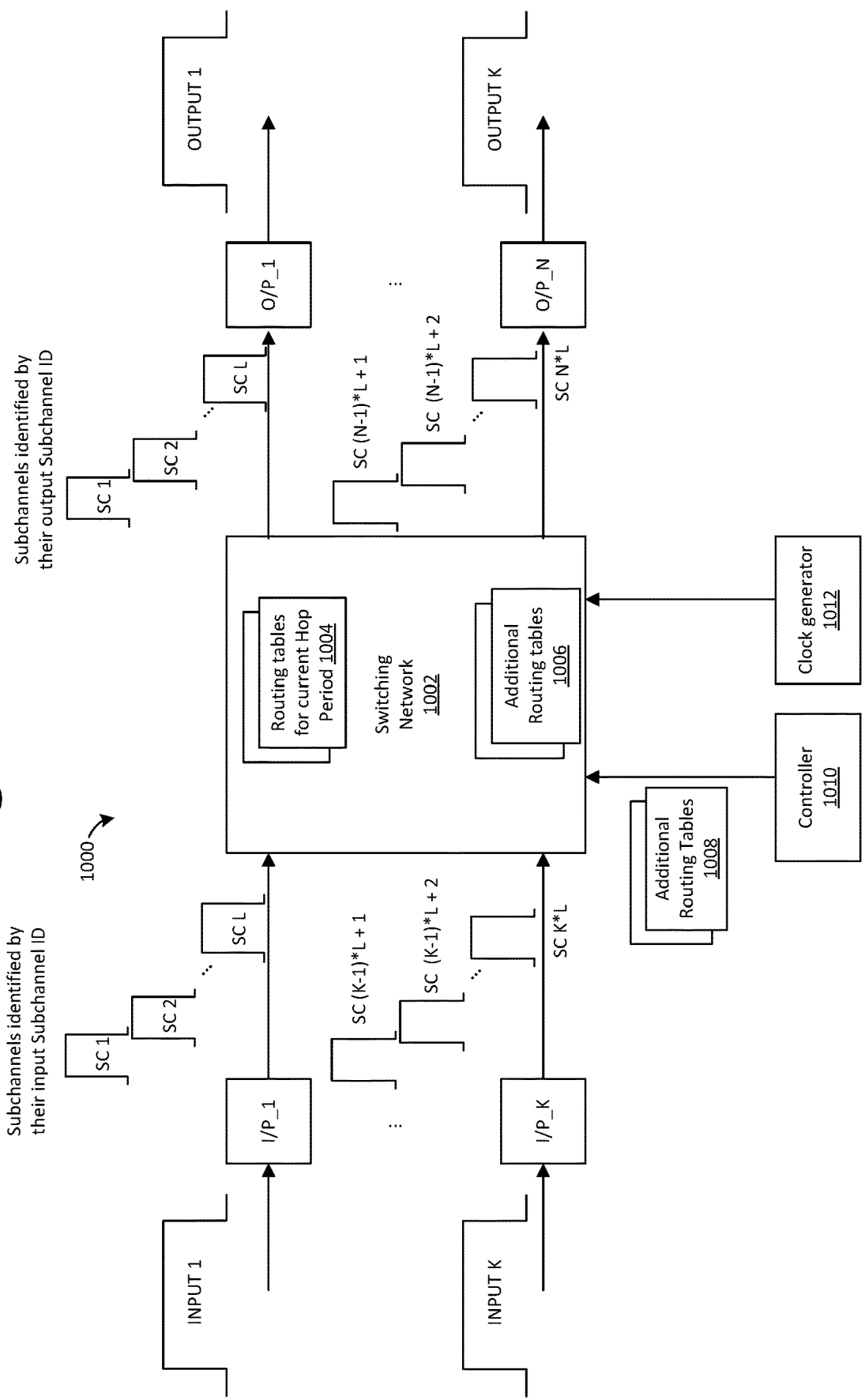
FIG. 10 illustrates operation of a channelizer.

FIG. 9D shows a different conceptual illustration of some operations of an input port such as input port 900. In this example, in contrast to the example of FIG. 9B, Input 1 is sampled first by sampling circuits 990 and is subsequently digitally filtered by filters 992 into subchannels SC_1-SC_L according to frequency, i.e. array of digital filters 992 divides digital samples into L subchannels of different frequencies. Serializer 994 serializes data from subchannels SC_1-SC_L to provide digital a combined output as a serial stream. Thus, while sampling of all subchannels may occur in parallel, sampled data from different subchannels may be output in series. This may be reversed by an output port where different subchannels may be multiplexed FIG. 10 illustrates an example of a channelizer 1000 (for example a channelizer like channelizer 442 discussed above, embodied in a satellite payload) that has K input ports, I/P_1-I/P_K, where K may be two or more (in other examples, a single input port may be used). Each input port, I/P_1-I/P_K, supports L subchannels, so that the total number of subchannels supported by the K input ports, I/P_1-I/P_K, is L*K. Thus, input port I/P_1 supports subchannels SC_1-SC_L, while input port I/P_K supports subchannels SC_(K−1)*L+1-SC_K*L. Digital samples for a given frame are provided by input ports I/P_1-I/P_K to switching network 1002, which uses the routing tables 1004 for the current hop period (or active hop period) to route subchannel data from input ports, I/P_1-I/P_K, to output ports, O/P_1-O/P_N.

Output ports O/P_1-O/P_N each support L subchannels. Thus, each of the N output port, O/P_1-O/P_N, receives sampled data corresponding to L subchannels for a total of L*N output subchannels, shown as SC_1-SC_L*N. The number of input subchannels L*K and output subchannels L*N may be the same or may differ. It will be understood that subchannel data may be routed in any manner between input ports and output ports and that similarly numbered input and output subchannels are not necessarily the same (i.e. input subchannel SC_X does not necessarily map to output subchannel SC_X). Subchannel numbers on the left of switching network 1002 refer to input subchannel IDs (or "receive subchannel IDs") while subchannels on the right of switching network 1002 refer to output subchannel IDs (or "transmit subchannel IDs").

Input subchannels may map to output subchannels in different patterns at different times according to routing tables. For example, routing tables 1004 may include a set of routing tables for a current hop period of a beam hopping scheme. Such a set of routing tables may be used in sequence during a hopping period, and may be repeated during subsequent hopping periods or switched to a different set of routing tables. Routing tables for a current hop period may be maintained in a high-speed memory such as Random Access Memory (RAM) or other volatile memory within switching network 1002. Additional routing tables 1006 are provided in switching network 1002. Additional routing tables 1006 may include routing for one or more hopping periods other than the current (active) hopping period. For example, additional routing tables 1006 may include a set of routing tables for a next hopping period. Additional routing tables 1006 may be maintained in high-speed memory or may be maintained in a memory that allows them to be rapidly loaded into high-speed memory when they are active or about to become active.

Additional routing tables 1008 are maintained outside switching network 1002. For example, additional routing tables 1008 may include one or more additional sets of tables for one or more additional hopping periods that are not active and are not about to become active. Additional routing tables 1008 be maintained in a non-volatile memory in a channelizer or elsewhere (e.g. in a shared data storage structure outside of the channelizer). Storing a large number of routing tables, each with a large number of entries may require significant storage.

Controller 1010 controls operation of switching network 1002. For example, controller 1010 selects a set of tables for a current hopping period and manages transitions between sets of tables from hopping period to hopping period. Controller 1010 may control loading of a set of routing tables into high-speed memory when the set of routing tables is the next active set. Controller 1010 may be substantially similar to control unit 558 of FIGS. 7 and 8.

Clock generator 1012 provides one or more clock signals to switching network 1002. Clock generator 1012 may be substantially similar to clock generator 560 of FIGS. 7 and 8 and may receive an input from an external timing and control unit (e.g. timing and control unit 714) that ensures that clock signals provided to switching network 1002 are synchronized with synchronization signals sent to other components such as ferrite switches, etc.

Figure 11:
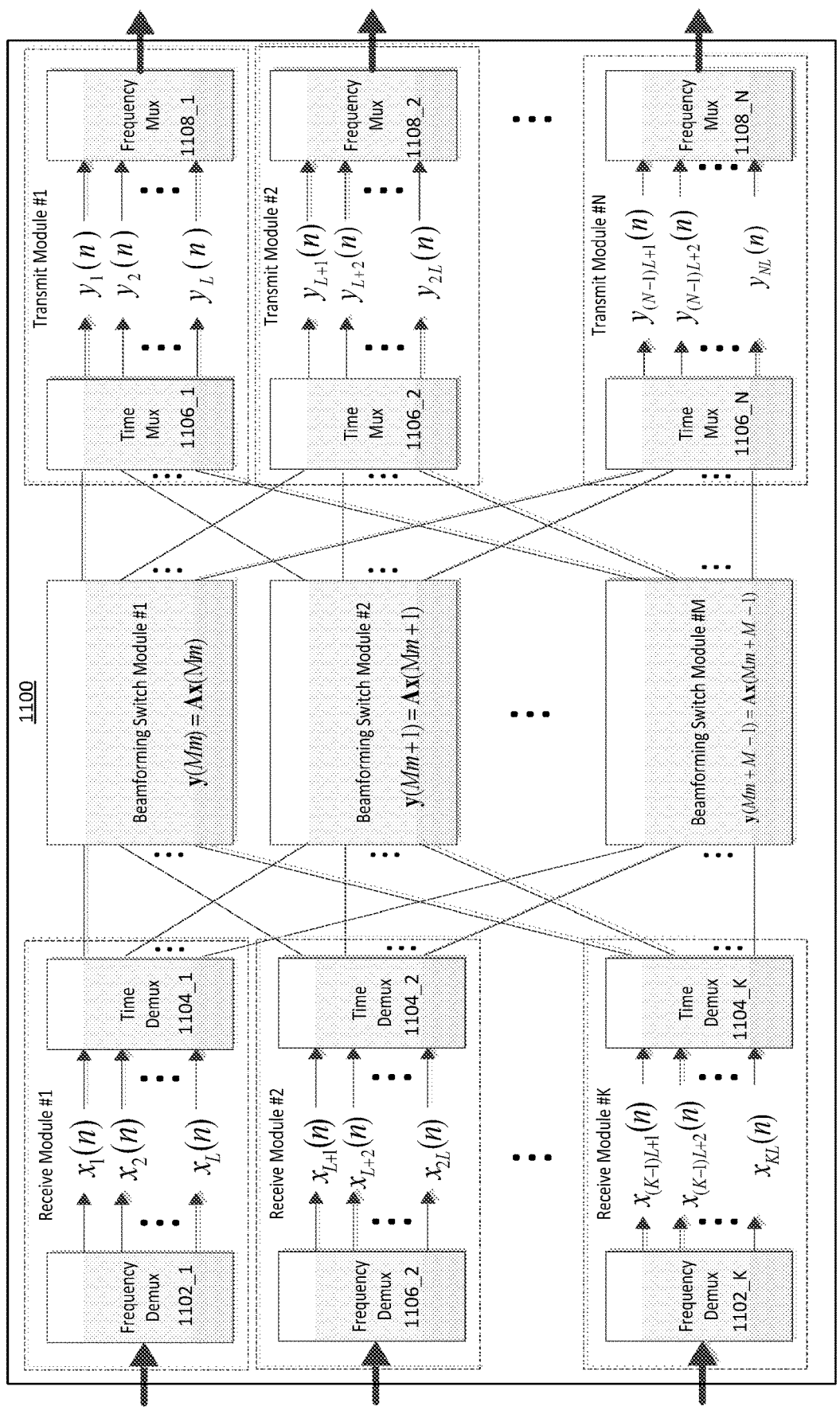
FIG. 11 illustrates another example of a channelizer.

FIG. 11 illustrates an embodiment of a channelizer 1100 that may be implemented in a satellite, e.g. a channelizer like channelizer 442 of FIGS. 6-8 above, embodied in a satellite payload. Channelizer 1100 includes K receive modules, receive module #1-receive module #K providing outputs to M switch modules (switch circuits), Beamforming switch module #1-Beamforming switch module #M, that in turn provide outputs to N transmit circuits, transmit circuit #1-transmit circuit #N. While the term "beamforming" is used with switch modules (switch circuits) in some examples, it will be understood that such switch modules are capable of implementing other switching schemes that are not beamforming schemes, e.g. beam hopping schemes, or other switching schemes, and that beamforming switch circuits are not limited to implementing beamforming schemes. The numbers K, M, and N may be selected according to system design considerations and do not have any predetermined relationship.

Receive modules #1-#K include time-division demultiplexers that provide time-division outputs for different distinct sample periods to different beamforming switches. This allows distribution of switching of each subchannel across all beamforming switch modules, with each beamforming switch module being dedicated to a different distinct sample period. Beamforming switch modules #1-#M are configured to receive time-division outputs from receive modules #1-#K and are configured to route portions of data to transmit modules #1-#N, where time multiplexers 1106_1-1106_N are configured to time-division multiplex inputs to generate output subchannels $y_1(n)$-$y_{NL}(n)$. Frequency multiplexers 1108_1-1108_N are configured to receive output from time multiplexers 1106_1-1106_N (i.e. subchannels $y_1(n)$-$y_{NL}(n)$) and generate frequency multiplexed outputs. Thus, rather than routing an individual subchannel through a single switch module, subchannels are time-division demultiplexed prior to switching and switched subchannels are time-division multiplexed after switching, with switching performed by switch modules that are dedicated to particular sample periods, each such switch module switching all subchannel data for its associated sample period. This provides flexibility and scalability in channelizer design.

Receive modules #1-K may be substantially identical units, with each receiving a similar input (e.g. 540 MHz input) from a receiver antenna array (e.g. through ferrite switches, and amplifiers, as shown in FIG. 8), which are provided to respective frequency demultiplexers 1102_1-1102_K. Frequency demultiplexers 1102_1-1102_K perform frequency-division demultiplexing to demultiplex multiple subchannels that may be received in an input. For example, subchannels $X_1(n)$-$X_L(n)$ are provided by frequency demultiplexer 1102_1, subchannels $X_{L+1}(n)$-$X_{2L}(n)$ provided by frequency demultiplexer 1102_2, and subchannels $X_{(K-1)L+1}(n)$-$X_L(n)$ provided by frequency demultiplexer 1102_1. Thus, each frequency demultiplexer 1102_1-1102_K provides L subchannels from its received input, for a total of K*L subchannels provided by frequency demultiplexers 11021-1102_K (frequency demultiplexers 1102_1-1102_K may collectively be referred to as a frequency demultiplexing stage). Frequency demultiplexers 1102_1-1102_K provide subchannels to time-division demultiplexers 1104_1-1104_K respectively. Time-division demultiplexers 1104_1-1104_K perform time-division demultiplexing on received subchannels to each provide multiple outputs as illustrated in FIG. 11 and may be considered collectively as a time-division demultiplexing stage. Time-division demultiplexers 1104_1-1104_K provide outputs to beamforming switch modules #1-#M, which collectively form a switching stage, or switching network that sends switched outputs to transmit modules #1-#N. Transmit modules #1-#n each include a time-division multiplexer and a frequency multiplexer. Time-division multiplexers 1106_1-1106_N are configured to time-division multiplex input subchannel data and may be considered a time-division multiplexing stage. Frequency multiplexers 1108_1-1108_N are configured to frequency multiplex switched time-division outputs and may be considered a frequency multiplexing stage.

Figure 12:
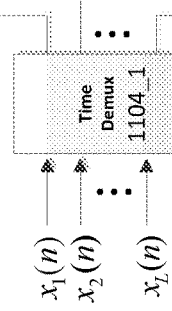
FIG. 12 illustrates time-division demultiplexing of sub-channels in a receive circuit.

FIG. 12 illustrates an example of time-division demultiplexing of subchannels $X_1(n)$-$X_L(n)$ by time-division demultiplexer 1104_1. Specifically, time-division demultiplexer 1104_1 provides M time-division outputs to Beamforming switch modules #1-M, with each such time-division output including portions of data from each subchannel $X_1(n)$-$X_L(n)$ received by time-division multiplexer 1104_1. Each time-division output corresponds to a different distinct sample period, so that each time-division output includes a portion of data from each subchannel $X_1(n)$-$X_L(n)$ from the individual sample period assigned to that output. Thus, for example, the output to beamforming switch module #1 includes samples of each subchannel $X_1(n)$-$X_L(n)$ for sample period 0 ($X_1(0)$-$X_L(0)$). Sample periods assigned to an output are cycled so that the output to beamforming switch module #1 also includes samples of each subchannel $X_1(n)$-$X_L(n)$ for sample period M ($X_1(M)$-$X_L(M)$), where M is the number of beamforming switch modules and also the number of sample periods in a cycle. Thus, the output to beamforming switch module #1 also includes samples at times 2M, 3M . . . and so on. These times may be referred to as times Mm, where m includes integers from 0 upwards. Thus, portions of data provided to beamforming switch module #1 include portions of data from all subchannels $X_1(n)$-$X_L(n)$ for specific sample periods, with sample periods occurring in a repeated cycle. The number M (number of sample periods in a cycle and the number of switch circuits) is a configuration parameter that may be configured according to the number of switch circuits. For example, more switch circuits may be added and the number of sample periods in a cycle may be increased accordingly to increase switching capacity.

FIG. 12 also illustrates that the output to beamforming switch module #2 includes samples of each subchannel $X_1(n)$-$X_L(n)$ for sample period 1 ($X_1(1)$-$X_L(1)$). Sample periods assigned to an output are cycled so that the output to beamforming switch module #2 also includes samples of each subchannel $X_1(n)$-$X_L(n)$ for sample period M+1 ($X_1(M+1)$-$X_L(M+1)$). The output to beamforming switch module #2 also includes samples at times 2M+1, 3M+1 . . . and so on. These times may be referred to as times Mm+1. Thus, portions of data provided to beamforming switch module #2 include portions of data from all subchannels $X_1(n)$-$X_L(n)$ for specific sample periods that are different to those of beamforming switch module #1, with sample periods occurring in a repeated cycle.

FIG. 12 also illustrates that the output to beamforming switch module #M includes samples of each subchannel $X_1(n)$-$X_L(n)$ for sample period 1 ($X_1(M-1)$-$X_L(M-1)$). Sample periods assigned to an output are cycled so that the output to beamforming switch module #M also includes samples of each subchannel $X_1(n)$ $X_L(n)$ for sample period 2M−1 ($X_1(2M-1)$-$X_L(2M-1)$). The output to beamforming switch module #M also includes samples at times 3M−1, 4M−1 . . . and so on. These times may be referred to as times Mm+(M−1). Thus, portions of data provided to beamforming switch module #M include portions of data from all subchannels $X_1(n)$-$X_L(n)$ for specific sample periods, with sample periods occurring in a repeated cycle.

Figure 13:
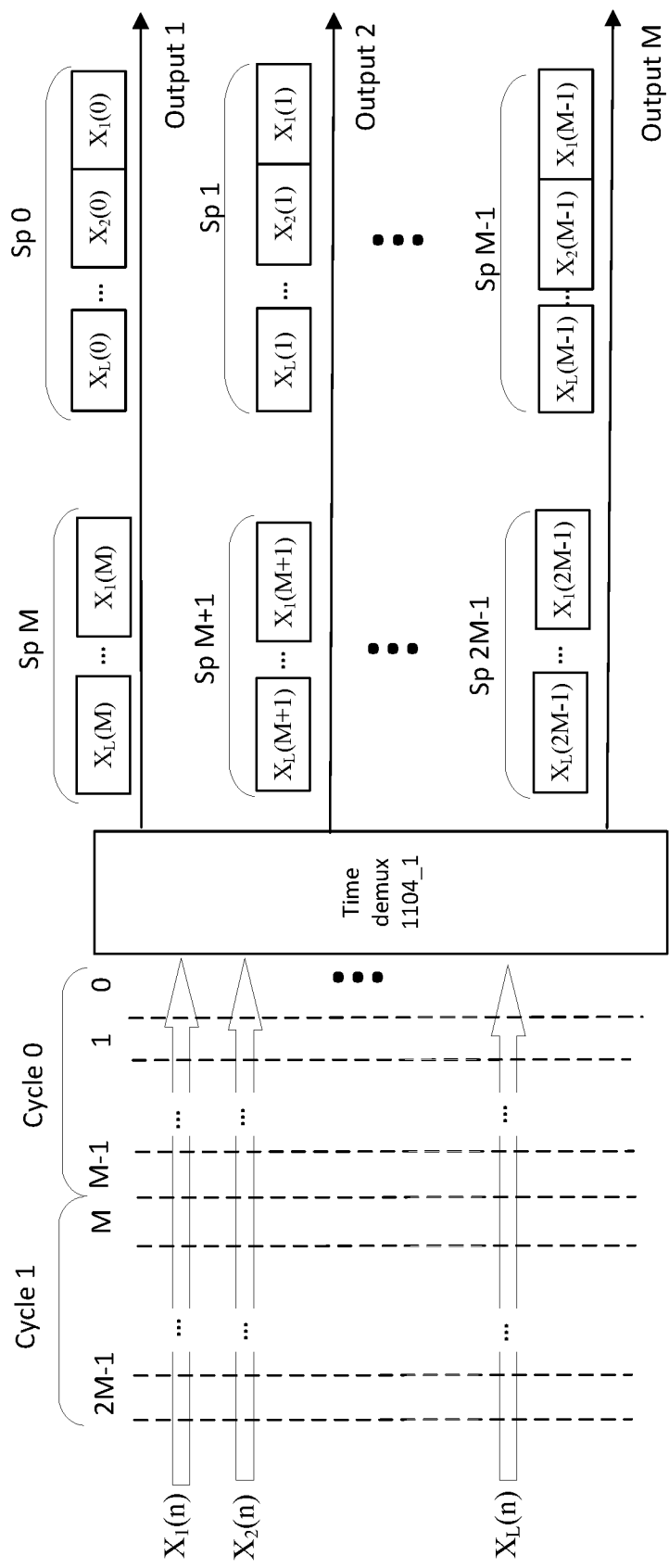
FIG. 13 illustrates time-division demultiplexing into outputs by sample period.

FIG. 13 provides a further illustration of how time demultiplexer 1104_1 provides outputs that each include portions of data from each subchannel $X_1(n)$-$X_L(n)$. Subchannels $X_1(n)$-$X_L(n)$ are illustrated over 2M distinct sample periods, corresponding to two cycles (cycle 0 and cycle 1) of a cyclic sampling scheme that has M sampling periods per cycle to provide M outputs, where each output is assigned to a different sampling period of a cycle. Cycle 0 consists of sample periods 0-M−1 and cycle 1 consists of sampling periods M to 2M−1. It will be understood that any number of cycles may be provided in a repeated sampling scheme like this. In cycle 0, time demultiplexer 1104_1 samples data of all subchannels $X_1(n)$-$X_L(n)$ at sample period 0 and provides the samples ($X_1(0)$-$X_L(0)$) for sample period 0 (Sp 0) on output 1 (output to switch 1). Time demultiplexer 1104_1 samples data of all subchannels $X_1(n)$-$X_L(n)$ at sample period 1 and provides the samples ($X_1(1)$-$X_L(1)$) for sample period 1 (Sp 1) on output 2 (output to switch 1). This continues for M sample periods of a cycle. Time demultiplexer 1104_1 samples data of all subchannels $X_1(n)$-$X_L(n)$ at sample period M−1 and provides the samples ($X_1$(M−1)-$X_L$(M−1)) for sample period M−1 (Sp M−1) on output M (output to switch M). In cycle 1, time demultiplexer 1104_1 samples data of all subchannels $X_1(n)$-$X_L(n)$ at sample period M and provides the samples ($X_1$(M)-$X_L$(M)) for sample period M (Sp M) on output 1 (output to switch 1). This continues for sample period M+1 (Sp M+1) for M sample periods of cycle 1. Time demultiplexer 1104_1 samples data of all subchannels $X_1(n)$-$X_L(n)$ at sample period 2M−1 and provides the samples ($X_1$(2M−1)-$X_L$(2M−1)) for sample period 2M−1 (Sp 2M−1) on output M (output to switch M). Thus, each output includes data from all subchannels $X_1(n)$-$X_L(n)$, with each output allocated to a particular sample period in a cycle of sampling periods.

While operation of demultiplexer 1104_1 is illustrated above, it will be understood that demultiplexers 1104_2 to 1104_K operate similarly to provide time-division outputs that are individually associated with sample periods and with each time-division output including data samples from all subchannels of a receive module. According to an example, time-division outputs from different receive modules for the same sample period are sent to the same switch module. Thus, data from subchannels of all receive modules (X1(n)-XKL(n)) for a given sample period may be sent to the same switch module (e.g. data from sample period Mm, $X_1$(Mm)-$X_L$(Mm) sent to switch 1 along with similar data for sample period Mm from other receive modules).

Figure 14:
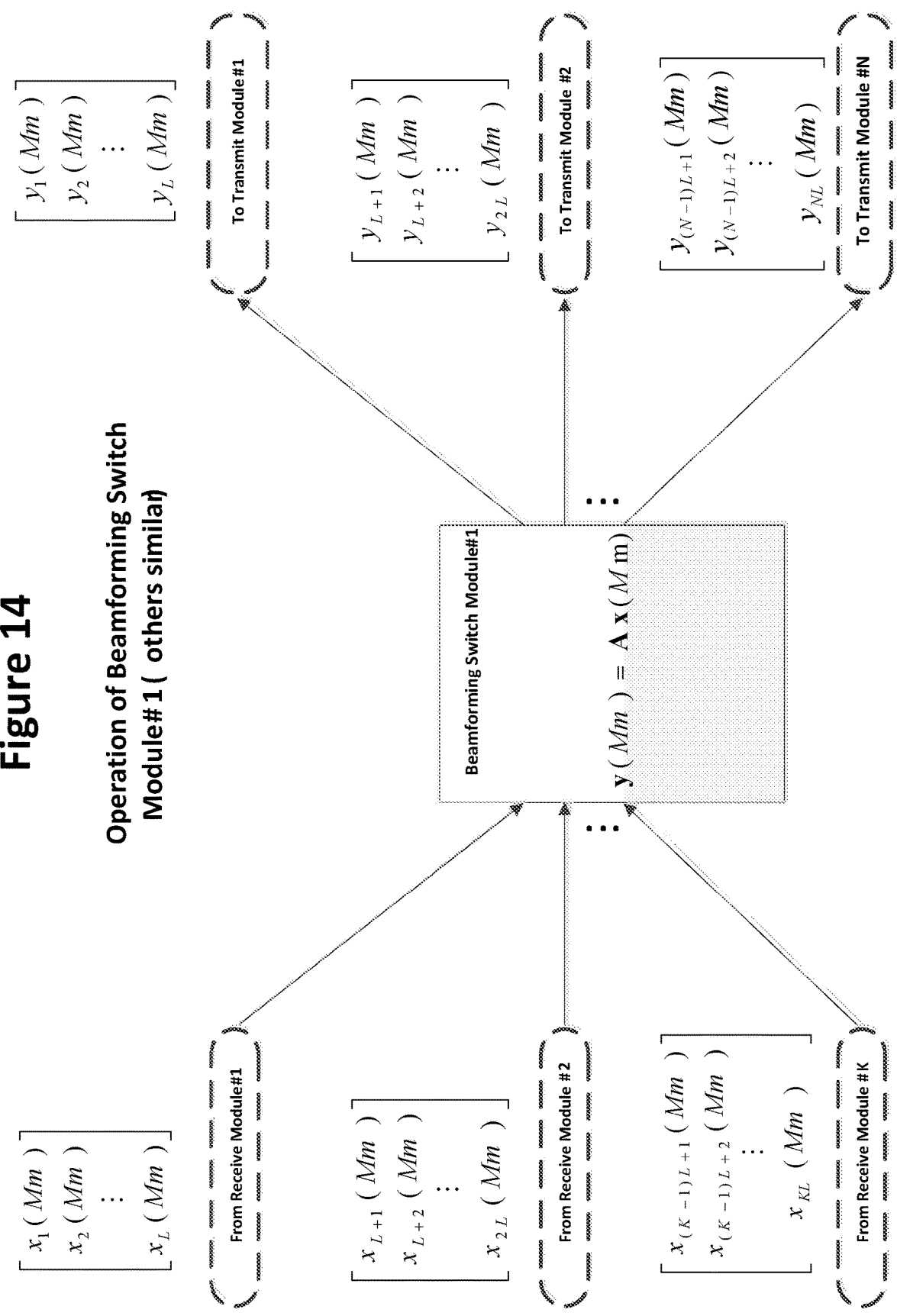
FIG. 14 illustrates a switch module.

FIG. 14 shows an example of operation of beamforming switch module #1 that receives time-division outputs for sample period Mm from receive modules #1-#K. Specifically, beamforming switch module #1 receives time-division output ($X_1$(Mm)-$X_L$(Mm)) from receive module #1, corresponding to sample periods 0, M, 2M, 3M . . . etc. and containing data samples from subchannels $X_1(n)$-$X_L(n)$ of receive module #1. Beamforming switch module #1 receives time-division output ($X_{L+1}$(Mm)-$X_{2L}$(Mm)) from receive module #2, corresponding to sample periods 0, M, 2M, 3M . . . etc. and containing data samples from subchannels $X_{L+1}(n)$-$X_{2L}(n)$ of receive module #2. Beamforming switch module #1 receives similar time-division outputs corresponding to sample periods 0, M, 2M, 3M . . . etc. (i.e. for sample periods Mm) from additional receive modules down to receive module #K. Beamforming switch module #1 receives time-division output ($X_{(K-1)L+1}$(Mm)-$X_{KL}$(Mm)) from receive module #K, corresponding to sample periods 0, M, 2M, 3M . . . etc. Thus, beamforming switch module #1 receives input for K*L subchannels (K receive modules, each supporting L subchannels) all for the same sample period Mm (individual sample periods 0, M, 2M, 3M . . . etc.). Beamforming switch module #1 is assigned to sample period Mm, while other beamforming switch modules are assigned to different sample periods as can be seen in FIG. 12. For example, beamforming switch module #2 is assigned to sample period Mm+1 and beamforming switch module #M is assigned to sample period Mm+(M−1). Each such beamforming switch may handle data of all subchannels of all receive circuits in this arrangement, with each beamforming switch allocated a different sample period. This arrangement provides a high degree of configurability.

In the generalized illustration of FIG. 14, time-division outputs from K receive modules for sample periods Mm ($x_1$(Mm) to $x_{KL}$(Mm)) are indicated collectively by x(Mm). Beamforming switch module #1 switches data received in time-division outputs x(Mm) to provide switched time-division outputs to transmit circuits #1-#N. These outputs, corresponding to output subchannels $y_1(n)$ to $y_{NL}(n)$ for sample periods Mm are represented collectively as y(Mm). Thus, switching and beamforming by beamforming switch module #1 may be represented by the equation: y(Mm)=A x(Mm). Writing x and y in vector form:

$$x = \begin{bmatrix} x_1(n) \\ x_2(n) \\ \vdots \\ x_{KL}(n) \end{bmatrix} \quad y = \begin{bmatrix} y_1(n) \\ y_2(n) \\ \vdots \\ y_{NL}(n) \end{bmatrix}$$

this equation may be written as follows:

$$\begin{bmatrix} y_1(Mm) \\ y_2(Mm) \\ \vdots \\ y_{NL}(Mm) \end{bmatrix} = A \begin{bmatrix} x_1(Mm) \\ x_2(Mm) \\ \vdots \\ x_{KL}(Mm) \end{bmatrix}$$

$$\begin{bmatrix} \{y_1(0), y_1(M), y_1(2M), ...\} \\ \{y_2(0), y_2(M), y_2(2M), ...\} \\ \vdots \\ \{y_{NL}(0), y_{NL}(M), y_{NL}(2M), ...\} \end{bmatrix} = A \begin{bmatrix} \{x_1(0), x_1(M), x_1(2M), ...\} \\ \{x_2(0), x_2(M), x_2(2M), ...\} \\ \vdots \\ \{x_{KL}(0), x_{KL}(M), x_{KL}(2M), ...\} \end{bmatrix}$$

A may be represented by an arbitrary matrix operator:

$$A = \begin{bmatrix} a_{1,1} & \cdots & a_{1,KL} \\ \vdots & \ddots & \vdots \\ a_{NL,1} & \cdots & a_{NL,KL} \end{bmatrix}$$

Figure 15:
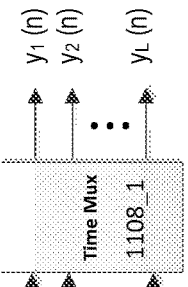
FIG. 15 illustrates time-division multiplexing in a transmit circuit to form output subchannels.

Outputs from switch circuits, including beamforming switch module #1 of FIG. 14 are switched time-division outputs, with each beamforming switch module generating switched time-division outputs for a different sample period. An advantage of this configuration is that an individual switch module generally acts independently and does not have to communicate with other switch modules in a switching stage. In general, subchannel data is not sent from switch module to switch module because each switch module operates independently on data of a different discrete sample period. Thus, communications between switch modules of a switching stage may be largely unnecessary and the complexity, latency and power dissipation associated with communications between multiple switching circuits may be reduced or avoided. FIG. 15 illustrates sending time-division outputs from beamforming switch modules #1-#M (corresponding to sample periods 0-M−1) to time-division multiplexer 1108_1 of transmit circuit #1. Time-division multiplexer 1108_1 performs time-division multiplexing to generate output subchannels $y_1[n]$-$y_L[n]$ that may individually include data from all sample periods. For example, output subchannel $y_1[n]$ may be generated by combining $y_1$(Mm) from beamforming switch module #1, $y_1$(Mm+1) from beamforming switch module #2 . . . $y_1$(Mm+(M−1)) from beamforming switch module #M. This process is similar to the process of FIG. 13 in reverse. Thus, output subchannels $y_1[n]$-$y_L[n]$ may be formed by combining switched time-division outputs corresponding to different sample periods to form subchannels that may be continuous through an extended time period (e.g. multiple cycles, each cycle including multiple sample periods).

The following description illustrates the operation of time-division processing applied to digital beamforming payloads and advantages with respect to alternate implementations. In beamforming mode, a beamforming switch module forms any receive beam by weighting the receive element subchannels from the receive antenna array used for the receive beam with provided amplitude and phase factors and performing an arithmetic sum. The same element subchannels may be reused to form any number of receive beams over the same operating frequency (receive frequency reuse). Any given subset of the resulting subchannels (receive beamforming sub-band) is then routed to the subset of the destination transmit beam (transmit beamforming subband) by replicating the subchannel values and applying the amplitude and phase factors that correspond to each element of the transmit antenna array used for the transmit beam. Again, multiple transmit beams may share a given element for a given output frequency, in which case the output subchannel value will be the arithmetic sum of excitation values for all transmit beams using this element and frequency (transmit frequency reuse). The transmit beamforming sub-band may also be shifted in frequency with respect to the receive beamforming sub-band by assigning a transmit beamforming sub-band that has a different operating frequency than the receive beamforming sub-band. Optionally, a scaling factor may be applied to the transmit beamforming sub-bands to control the energy of the output signals. These operations together implement beamforming, routing and gain control and may be represented by a single matrix operator A as previously defined. In general, matrix A may implement any linear operation and is not limited to the operations described previously. For example, the beamforming switch may also be used to apply the pre-processing for a multi-port amplifier (input hybrid matrix) or equalization of the input or output signals. Matrix A may be static or time-dependent depending on the operation to be performed. Such description of the transformation being equivalent to a single matrix operator does not limit the implementation to any specific mechanism. In some cases, it may be optimal for implementation purposes to factor A into multiple sub-matrices or sub-operations.

With the proposed time-division processing, all beamforming switches have access to all input and output subchannels of the system and form all receive and transmit beams of the system over a subset of all sample periods. Therefore, any number of receive or transmit beams may be formed and these beams may use an unlimited number of elements, with the practical limitation being driven solely by computational capability of the beamforming switch module. Moreover, any sub-band of any digitally formed receive beam may be routed to any sub-band of any digitally formed transmit beam via operations internal to the beamforming switch, thus allowing non-blocking operation of the network without necessitating any additional communication between the switches, receive or transmit modules.

In an alternate implementation, distributing processing among beamforming switches to achieve non-blocking beamforming and routing capability uses additional communication resources, either by adding communication capability between the beamforming switches or by increasing the communication bandwidth between the receive modules, beamforming switches and transmit modules. In such an alternate implementation, one may assign the processing of different receive and transmit beamforming sub-bands to different switches. If the receive beamforming sub-band is not processed in the same switch as the transmit beamforming sub-band to which it is routed, additional routing capability must be implemented to redirect the receive beamforming sub-band to the proper switch for transmit processing. In such alternate scheme, one may attempt to reassign the processed transmit or receive beamforming sub-bands among the switches based on the requested operational scenario in order to minimize or eliminate the need for communicating among the switches. However, this reassignment may result in more communication resources being required between receive, beamforming switch and transmit modules. For example, in the case where two different receive beamforming sub-bands sharing the same operating frequency would be processed by two different switches, it would be necessary to send the input element subchannels corresponding to the operating frequency of the sub-bands to both switches, resulting in extra communication resources requirements with respect to the proposed scheme. If the upper limit of the communication bandwidth is reached and a routing request cannot be fulfilled, blockage results and the new request must be denied or one or multiple existing communications must be terminated. Even when providing such additional communication bandwidth, it remains challenging to prove that such alternate processing scheme would be non-blocking for any operational scenario, especially in the context where the set of scenarios may not be precisely known before launch time or may change during the lifetime of the satellite. Such alternate processing scheme also requires complex optimization schemes to make the best use of available resources. As a result, processing time to implement a route change and system complexity increase.

A channelizer implementing the time-division scheme provides flexibility to route communications in various ways. Some examples of such routing (or switching) and beamforming are provided here for illustration. It will be understood that these are for example and that the present technology can be applied in many other arrangements.

Figure 16A:
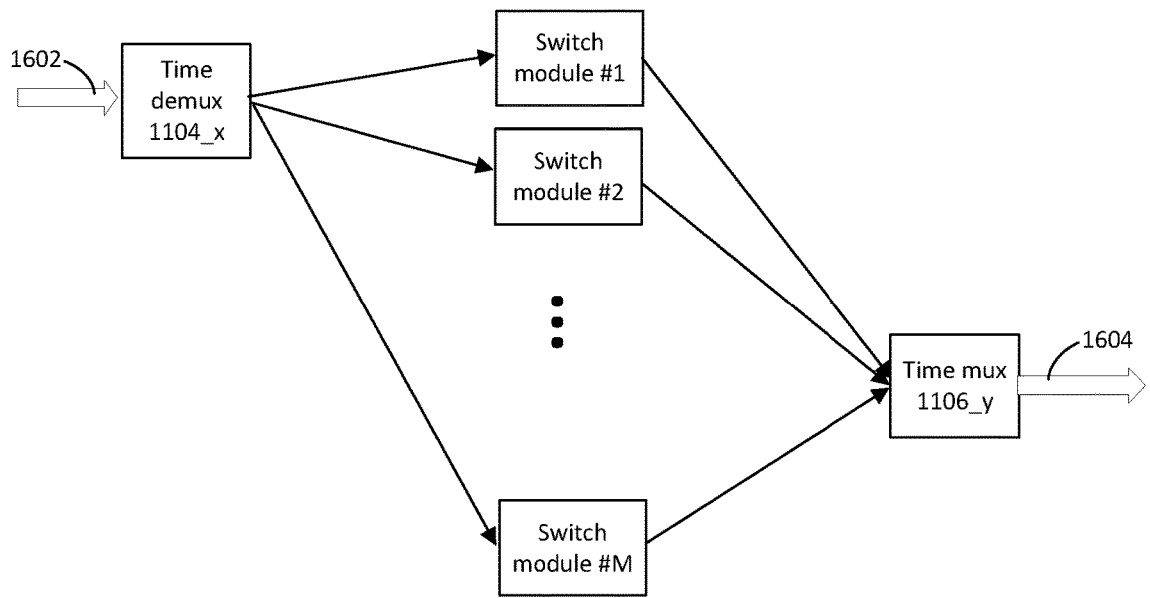

FIG. 16A shows an example of an input subchannel 1602 that is received by a time-division demultiplexer 1104_x, which may be any of the time-division demultiplexers 1104_1-1104_K of FIG. 11, which performs time-division demultiplexing to distribute data of input subchannel 1602 to beamforming switch modules #1-#M (switch modules #1-#M). Switch modules #1-#M switch data of input subchannel 1602 to time-division multiplexer 1106_y, which may be any of the time-division multiplexers 1106_1-1106_N, which performs time-division multiplexing to generate output subchannel 1604. In this example, output subchannel 1604 reproduces input subchannel 1602 so that, for example, a subchannel received as uplink communication by a receiver antenna is routed to a transmitter antenna to be sent as downlink communication. Thus, input subchannels may be mapped to output subchannels in a one-to-one mapping. This mapping may remain static over an extended time (e.g. communications to and from a geostationary satellite) or may change over time (e.g. according to a beam-hopping scheme, or other scheme). It can be seen that switching of input subchannel 1104_x is distributed across M switch module rather than being performed by a single switch module and that any input subchannel to any time-division demultiplexer may be provided as an output subchannel by any time-division multiplexer, without exchange of data between switch modules.

Figure 16B:
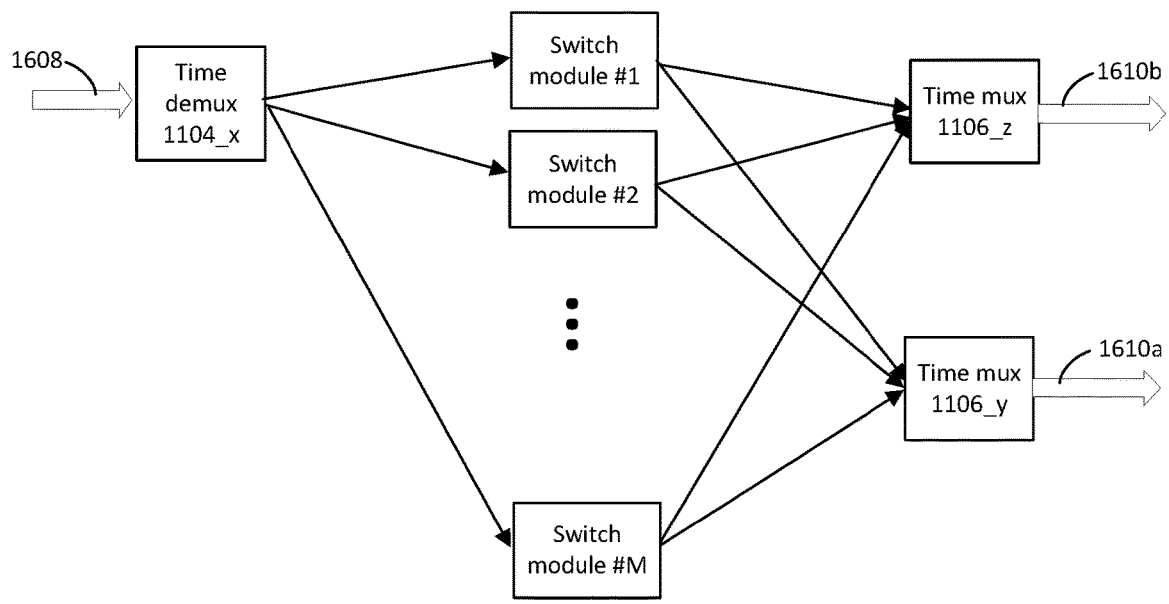

FIG. 16B shows another example of an input subchannel 1608 that is received by time-division demultiplexer 1104_x, which may be any of the time-division demultiplexers 1104_1-1104_K of FIG. 11, which performs time-division demultiplexing to distribute data of input subchannel 1608 to beamforming switch modules #1-#M (switch modules #1-#M). Switch modules #1-#M switch data of input subchannel 1608 to time-division multiplexer 1106_y and time-division demultiplexer 1106_z, which may be any of the time-division multiplexers 1106_1-1106_N, which perform time-division multiplexing to generate output subchannels 1610*a* and 1610*b* respectively. In this example, output subchannels 1610*a-b* reproduce input subchannel 1608 so that, for example, a subchannel received as uplink communication by a receiver antenna may be routed to one or more transmitter antennas to be sent as downlink communications. While just two output subchannels are shown, it will be understood that any number of output subchannels may be provided in this way to provide a number output subchannels from a single input subchannel. Thus, input subchannels may be mapped to output subchannels in a one-to-many mapping, for example, to broadcast a signal to two or more subscriber terminals.

One application of a one-to-many mapping may be beamforming. In general, beamforming uses an array of transmitter elements, with different phase and amplitude adjustments, to send a signal with a desired orientation (i.e. in a beam). Output subchannels 1610*a-b* (along with additional output subchannels as appropriate) may be provided to different transmitter elements of a beamforming array such as a phased array that is formed of phased array elements. The phase and amplitudes of output subchannels 1610*a-b* may be adjusted to achieve a desired beam orientation. This adjustment may be made in a channelizer or elsewhere. For example, routing tables may include phase and amplitude factors to be applied to outputs that are to be provided to transmitter elements of a beamforming antenna array. Phase and amplitude adjustment may be indicated in a matrix such as matrix A above so that a switch module may implement a beamforming scheme.

Figure 16C:
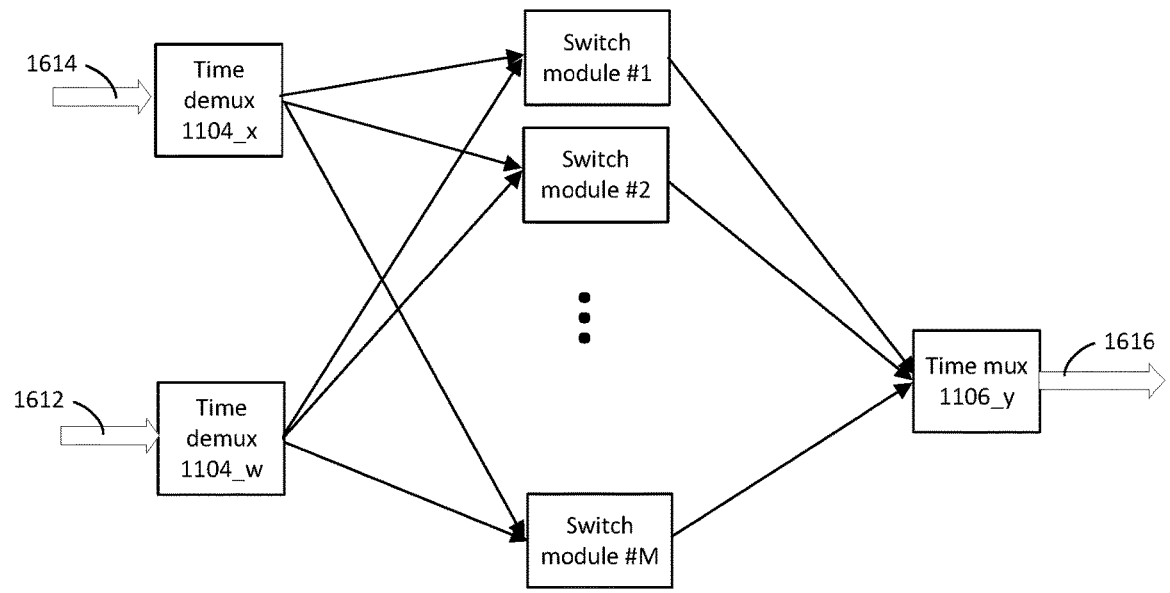

FIG. 16C shows an example of input subchannel 1612 that is received by time-division demultiplexer 1104_*w* and input subchannel 1614 that is received by time division demultiplexer 1104_*x*, which may be any of the time-division demultiplexers 1104_1-1104_K of FIG. 11. Time-division demultiplexers 1104_*w* and 1104_*x* perform time-division demultiplexing to distribute data of input subchannels 1612 and 1614 to beamforming switch modules #1-#M (switch modules #1-#M). Switch modules #1-#M provide data of input subchannels 1612 and 1614 to time-division multiplexer 1106_*y*, which may be any of the time-division multiplexers 1106_1-1106_N, which perform time-division multiplexing to generate output subchannel 1616. In this example, input subchannels 1612 and 1614 may be provided by receiver elements in antenna array. For example, input subchannels 1612 and 1614 may be subchannels received by different antenna elements at the same frequency and may be subject to amplification and phase adjustments according to a beamforming receiver scheme. Input subchannels 1612 and 1614 may be combined by beamforming switch modules #1-#M, e.g. by summing their weighted phase-adjusted amplitudes according to a matrix such as matrix A. Outputs from beamforming switch modules #1-#M are then combined by time-division multiplexer 1106_*y* to generate output subchannel 1616. While just two input subchannels are shown, it will be understood that any number of input subchannels may be combined in this way so that a signal with low signal-to-noise ratio that is received by multiple antenna elements produces multiple input subchannels that may be used to generate a single output subchannel that has relatively higher signal-to-noise ratio. Beamforming techniques may also be used to suppress interference from an undesired source. Thus, input subchannels may be mapped to output subchannels in a many-to-one mapping.

Figure 16D:
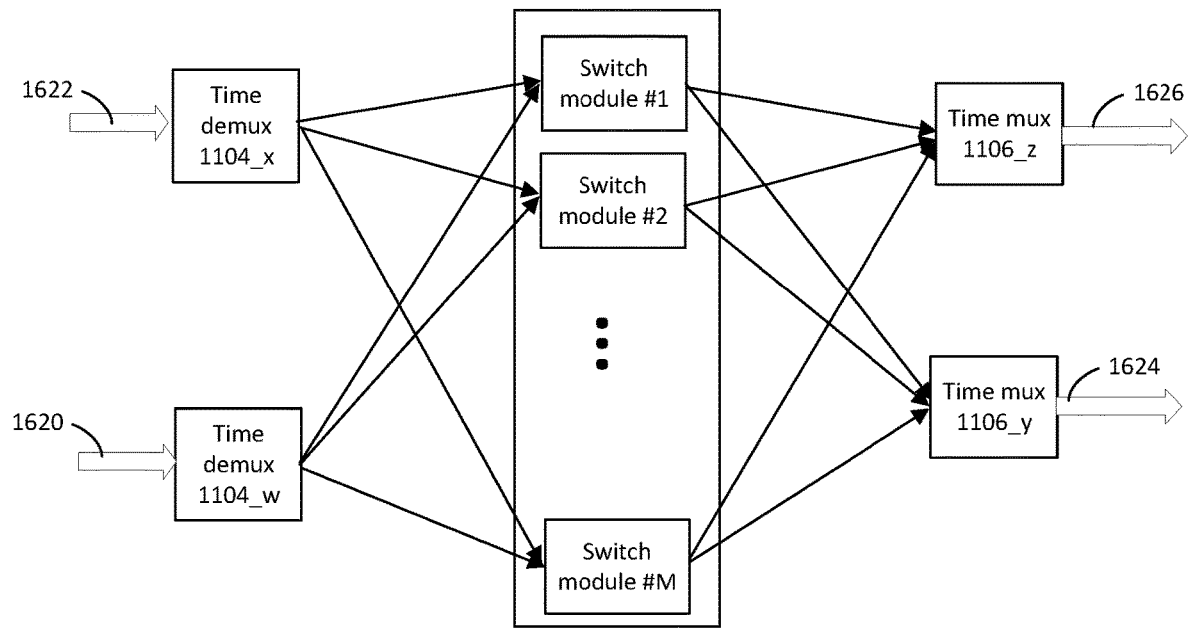

FIG. 16D shows an example of input subchannel 1620 that is received by time-division demultiplexer 1104_*w* and input subchannel 1622 that is received by time division demultiplexer 1104_*x*, which may be any of the time-division demultiplexers 1104_1-1104_K of FIG. 11. Time-division demultiplexers 1104_*w* and 1104_*x* perform time-division demultiplexing to distribute data of input subchannels 1620 and 1622 to beamforming switch modules #1-#M (switch modules #1-#M). Switch modules #1-#M provide data of input subchannels 1620 and 1622 to time-division multiplexers 1106_*y* and 1106_*z*, which may be any of the time-division multiplexers 1106_1-1106_N, which perform time-division multiplexing to generate output subchannels 1624 and 1626. In this example, input subchannels 1620 and 1622 may be provided by receiver elements in an antenna array. For example, input subchannels 1620 and 1622 may be subchannels received by different antenna elements at the same frequency and may be subject to amplification and phase adjustments according to a beamforming receiver scheme. Input subchannels 1620 and 1622 may be combined by beamforming switch modules #1-#M, e.g. by summing their weighted phase-adjusted amplitudes according to routing tables to generate outputs to time-division multiplexers 1106_*y* and 1106_*z*, which generate output subchannels 1624 and 1626 respectively. Output subchannels 1624 and 1626 may be provided to different transmitter antenna elements at the same frequency to implement a beamforming transmission scheme. Thus, a received signal may be enhanced by a receiver element array using beamforming techniques, and from this signal multiple output subchannels may be provided to multiple transmitter antenna elements to implement a beamforming transmission scheme.

FIG. 16E shows an example of receive and transmit beamforming with frequency reuse where two receive beams and two transmit beams share the same operating frequency. The system components, input and output subchannels 1620 and 1622 are the same as those shown in FIG. 16D. A first receive beamforming subchannel 1630 is formed from input subchannels 1620 and 1622 by applying complex weights $r_{1,1}$ and $r_{2,1}$ respectively and summing the results, where a complex weight represents a given gain and amplitude factor. A second receive beamforming subchannel 1628 is formed from the same input subchannels by applying complex weights $r_{1,2}$ and $r_{2,2}$ respectively and summing the results. The two resulting subchannels are thus formed using two different weight sets corresponding to two different receive beams. Receive beamforming subchannel 1630 is then routed to a transmit beam by replicating its content and applying complex weights $t_{1,1}$ and $t_{1,2}$ respectively to form partial output subchannels 1626 and 1624. Similarly, receive beamforming subchannel 1628 is routed to another transmit beam by replicating its content and applying complex weights $t_{2,1}$ and $t_{2,2}$ respectively to form partial output subchannels 1626 and 1624. The final values for output subchannels 1626 and 1624 are generated by summing the two partial values computed previously. Receive and transmit beamforming stages may be merged into an equivalent transformation, as shown in FIG. 16F, where a single complex weight applies to each path between any input and output subchannel. Matrix A, shown in FIG. 16G may be calculated by multiplying the transmit and receive beamforming matrices to provide a representation of the beamforming and switching operation as a single matrix operator as previously described.

While just two input subchannels and two output subchannels are shown, it will be understood that any number of input and output subchannels may be combined in this way so that a signal that is received by multiple antenna elements produces multiple input subchannels that may be used to generate multiple output subchannels according to a beamforming scheme. Thus, input subchannels may be mapped to output subchannels in a many-to-many mapping. Such beamforming schemes may be combined with other schemes such as beam hopping schemes. It will be understood that the examples of FIGS. 16A-G show particular schemes and that such schemes may be applied to different subchannels at the same time (i.e. a channelizer may perform one-to-one switching, one-to-many switching, beamforming, and/or beam hopping at the same time).

Figure 17:
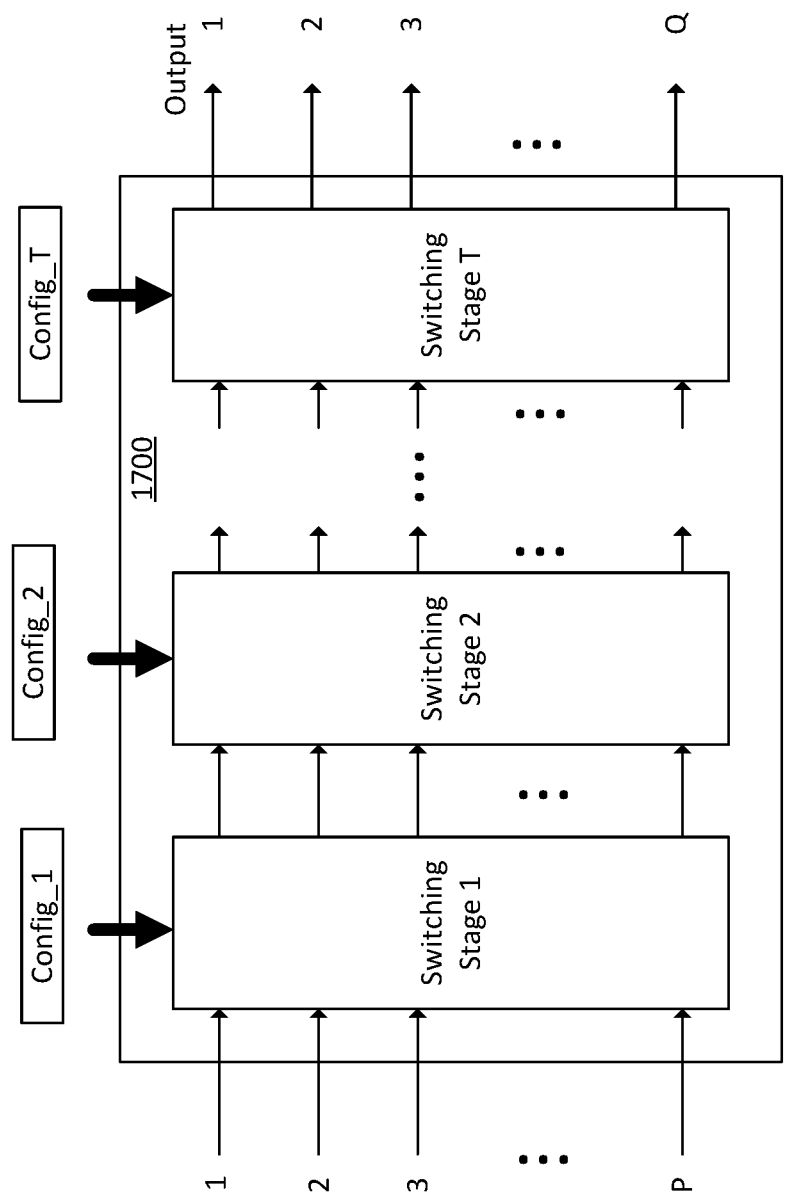
FIG. 17 illustrates a switch module with multiple switching stages.

FIG. 17 illustrates an individual switch circuit 1700 (e.g. one of beamforming switch modules #1-#M of FIG. 11). FIG. 17 shows T switching stages, switching stage 1-switching stage T, in beamforming switch circuit 1700. Individual switching stages may route data in various ways. A switching stage may include space switches, time switches, or a combination of space and time switches. Aspects of the present technology are not limited to any particular type of switch or design of a switching stage. In general, switching stage configurations such as config_1-config_T of FIG. 17 are generated from a switching table (which may be a beam hopping and/or beamforming table in some cases) and implement the switching at a lower level. For example, configurations config_1-config_T may be obtained from a switching table for switch circuit 1700 (which may be specific to the sample period associated with switch circuit 1700). Other switch circuits may have other switching tables, and switching tables of various switch circuits may form a larger switching table for a switching stage.

Figure 18:
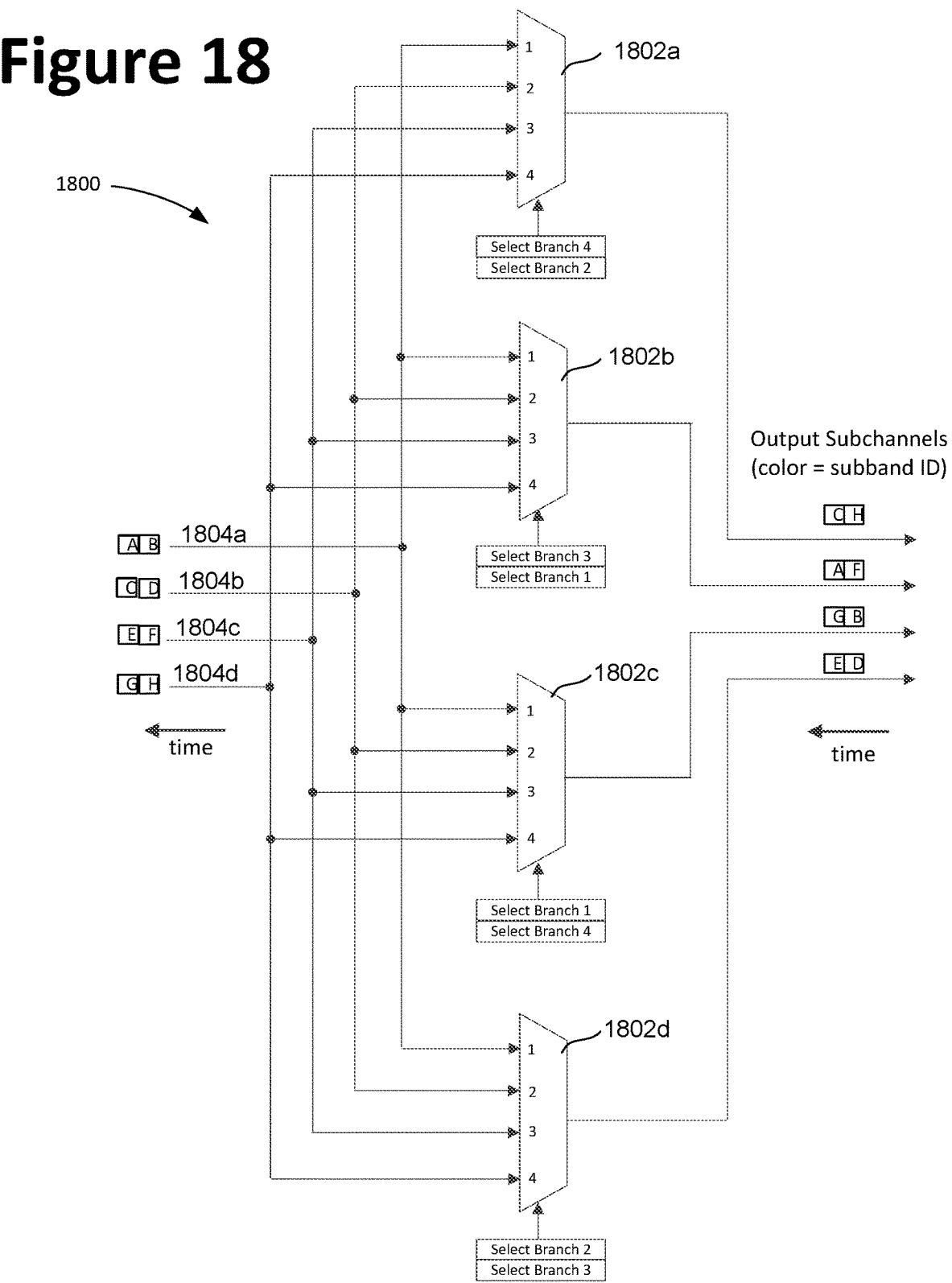
FIG. 18 illustrates switching hardware of a switching stage.

FIG. 18 illustrates an example of an implementation of a switching stage 1800 that has four inputs and four outputs and includes multiplexers 1802a to 1802d. Switching stage 1800 may be a switching stage of switch circuit 1700 of FIG. 17, or otherwise, embodied in a channelizer such as channelizer 442 as described above. The implementation of a switching stage is not limited to the structure shown in FIG. 18 and may include any other relevant technique such as time-domain switching or may also include circuitry to implement additional features such as beam hopping schemes.

Multiplexer 1802a is configured by a switching configuration to select branch 4 (input 4). Branch 4 of multiplexer 1802a connects to input 1804d so that multiplexer 1802a outputs a subchannel sample of sub-band H for a clock cycle. Next, multiplexer 1802a is configured by the switching configuration to select branch 2 (input 2) for a subsequent cycle. Branch 2 of multiplexer 1802a connects to input 1804b so that multiplexer 1802a outputs a subchannel sample of sub-band C for a clock cycle.

Multiplexer 1802b is configured by the switching configuration to select branch 3 (input 3) for a first clock cycle. Branch 3 of multiplexer 1802b connects to input 1804c so that multiplexer 1802b outputs a sample of sub-band F for a clock cycle. Multiplexer 1802b is configured by the switching configuration to select branch 1 (input 1) for a subsequent cycle. Branch 1 of multiplexer 1802b connects to input 1804a so that multiplexer 1802b outputs a subchannel sample of sub-band A for a cycle.

Multiplexer 1802c is configured by the switching configuration to select branch 1 (input 1) for a clock cycle. Branch 1 of multiplexer 1802c connects to input 1804a so that multiplexer 1802c outputs a sample of sub-band B for a clock cycle. Multiplexer 1802c is configured by the switching configuration to select branch 4 (input 4) for a subsequent cycle. Branch 4 of multiplexer 1802c connects to input 1804d so that multiplexer 1802c outputs a sample of sub-band G for a second clock cycle.

Multiplexer 1802d is configured by a switching configuration to select branch 2 (input 2) for a first clock cycle. Branch 2 of multiplexer 1802d connects to input 1804b so that multiplexer 1802d outputs a sample of sub-band D for a clock cycle. Multiplexer 1802d is configured by the switching configuration to select branch 3 (input 3) for a subsequent cycle. Branch 3 of multiplexer 1802d connects to input 1804c so that multiplexer 1802d outputs a sample of sub-band E for a clock cycle.

While the example of FIG. 18 shows four inputs and outputs over two clock cycles, it will be understood that the number of multiplexers, and number of inputs per multiplexer may be selected according to requirements and that four multiplexers with four inputs each is merely an example to illustrate operation of a switching stage.

Configurable Bandwidth

Figure 19:
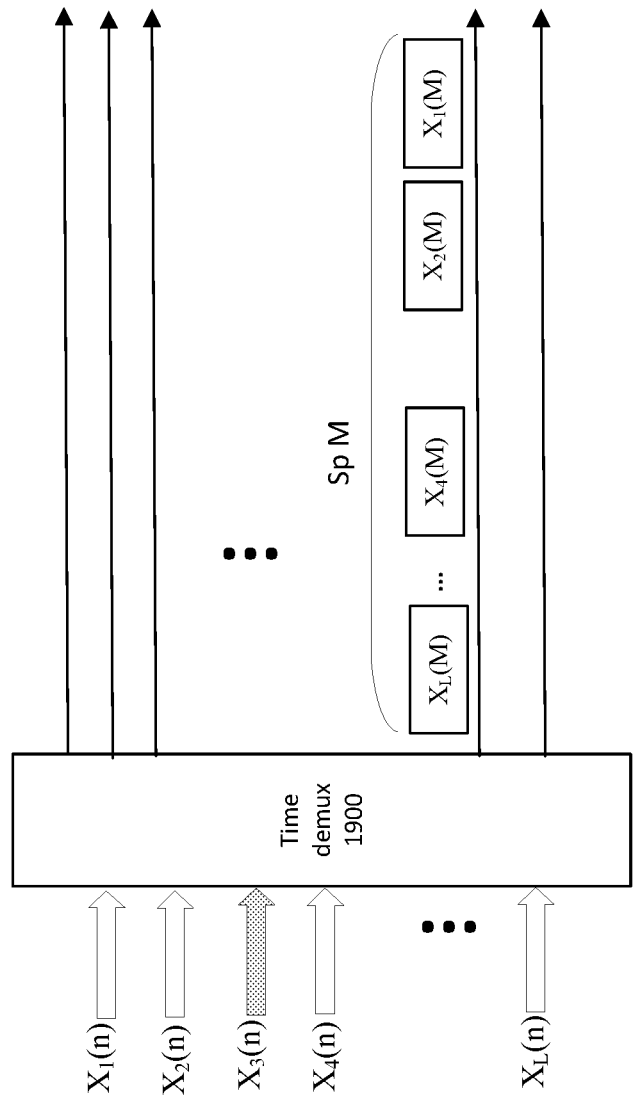
FIG. 19 illustrates selection of bandwidth for switching.

FIG. 19 illustrates an example of a portion of a receive module that includes a time-division demultiplexer 1900 that receives L input subchannels $X_1(n)$-$X_L(n)$ and provides different time-division outputs for different sample periods as before. In this example, not all input subchannels $X_1(n)$-$X_L(n)$ are multiplexed by time-division demultiplexer 1900. For example, FIG. 19 shows subchannel samples for sample period M that includes samples for subchannels $X_1(n)$, $X_2(n)$, $X_4(n)$ . . . $X_L(n)$. However, no sample is provided for subchannel $X_3(n)$. Thus, only a subset of frequency demultiplexed subchannels $X_1(n)$-$X_L(n)$ are sent to beamforming switch modules. For example, a receive module may accept an input of 540 MHz that is frequency demultiplexed into 540 input subchannels of 1 MHz each. Of these, 500 subchannels may be time-division demultiplexed and may have their data sent to switch modules. This allows for use of discontinuous frequency ranges and/or guard bands. Omitted subchannels may be configurable so that a receive module may be configured for different frequency use. For example, a generic receive module may be easily configured to output data from a subset of frequencies of its input frequency range. Such configuration may be done prior to use (e.g. when a satellite is manufactured). In some cases, such configuration may be done while a receive module is in operation (e.g. a satellite may be reconfigured while in space). While the example of FIG. 19 shows subchannel selection by time-division demultiplexer 1900, in other examples, selection may be performed differently, for example, by a frequency demultiplexer that outputs only a selected subset of possible subchannels at a given time (e.g. outputs 500 of 540 possible subchannels).

Switchless Operation

While switch modules as illustrated above provide flexibility in routing data and applying beamforming operations between multiple receive modules and transmit circuits, such flexibility may not always be necessary and in some situations a simpler design may be used. For example, in some cases, all subchannel data from an individual receive module may be sent to an individual transmit circuit so that there is no benefit to linking such a receive module to other transmit circuits through a switching network. Such a fixed arrangement may be implemented in a simple way, without switch modules between receive modules and transmit circuits. In this case time-division of the inputs is not used and the separation of the data from a single receive module to multiple transmit modules is performed on a subchannel (frequency) basis.

FIG. 20A shows an example of a block 2010 in which a receive module 2002a is directly coupled to a transmit module 2004a. Block 2010 may be implemented in a satellite, for example, as described above. Receive module 2002a receives a 2 GHz input and frequency demultiplexes the input into subchannels that are time-division demultiplexed and sent directly to transmit module 2004a, without passing through a switch. Receive module 2002a may be implemented as previously described, for example, similarly to receive module #1 shown in FIGS. 11-13 so that a common receive module may be used for the flexible switched arrangement of FIG. 11 and the fixed arrangement of FIG. 20A. Similarly, transmit module 2004a may be implemented as previously described, for example, similarly to transmit module #1 shown in FIG. 11 so that a common transmit module may be used for the flexible switched arrangement of FIG. 11 and the fixed arrangement of FIG. 20A. In the example shown, receive module provides 12 outputs that connect in parallel to transmit module 2004a. Other interconnect arrangements may also be used.

FIG. 20A also shows spare receive module 2002b and spare transmit module 2004b, which are identical to receive module 2002a and transmit module 2004a respectively and are provided to ensure that the system remains operational if a receive module and/or a transmit module fails. Spare receive module 2002b receives the same 2 GHz input as receive module 2002a and generates the same output. Both receive module 2002a and spare receive module 2002b have outputs connected to transmit module 2004a and spare transmit module 2004b so that if either receive module 2002a or 2002b fails, both transmit modules 2004a and 2004b can continue to receive the same input, and if either transmit module 2004a or 2004b fails the remaining transmit module continues to provide the same 2 GHz output. Thus, this arrangement allows operation to continue with one failed receive module and one failed transmit module. By not using switches modules, cost, power consumption, and latency may be reduced compared with some other arrangements. In another embodiment the spares are powered off by default and spare data is not actively transmitted unless the spares are turned on, thereby saving on power.

FIG. 20B shows how the arrangement of FIG. 20A can be expanded from 2 GHz to 4 GHz by adding another block that duplicates the arrangement of FIG. 20A. FIG. 20B shows block 2010, which was described above, and block 2012, which duplicates block 2010 to provide an additional 2 GHz of capacity.

FIG. 20C shows how the arrangement of FIG. 20B can be expanded from 4 GHz to 6 GHz by adding a third block that duplicates the arrangement of FIG. 20A. FIG. 20C shows blocks 2010 and 2012, which were described above, and block 2014, which duplicates block 2010 to provide an additional 201 Hz of capacity bringing the total capacity to 6 GHz. It will be understood that any number of such modules may be added in this manner to achieve a desired capacity. Furthermore, it will be understood that the numbers provided are an example and that other values may be used. For example, inputs and outputs may be wider or narrower than 2 GHz, there may be more or less than 12 outputs per receive module (more or less than 12 inputs per transmit module), and redundancy may be greater (e.g. two spare receive and/or transmit modules per block) or less (e.g. no spare receive module and/or spare transmit module in a block).

While the fixed arrangements of FIGS. 20A-C provide simplicity, in some cases it may be desirable to have output from a given receive module sent to more than one transmit module in a fixed arrangement without the complexity of switches. This may be achieved using a fixed division of the output of a receive module between two or more transmit modules. Thus, a given receive module may send a first portion of its output to a first transmit module and another portion of its output to a second transmit module.

Figure 20D:
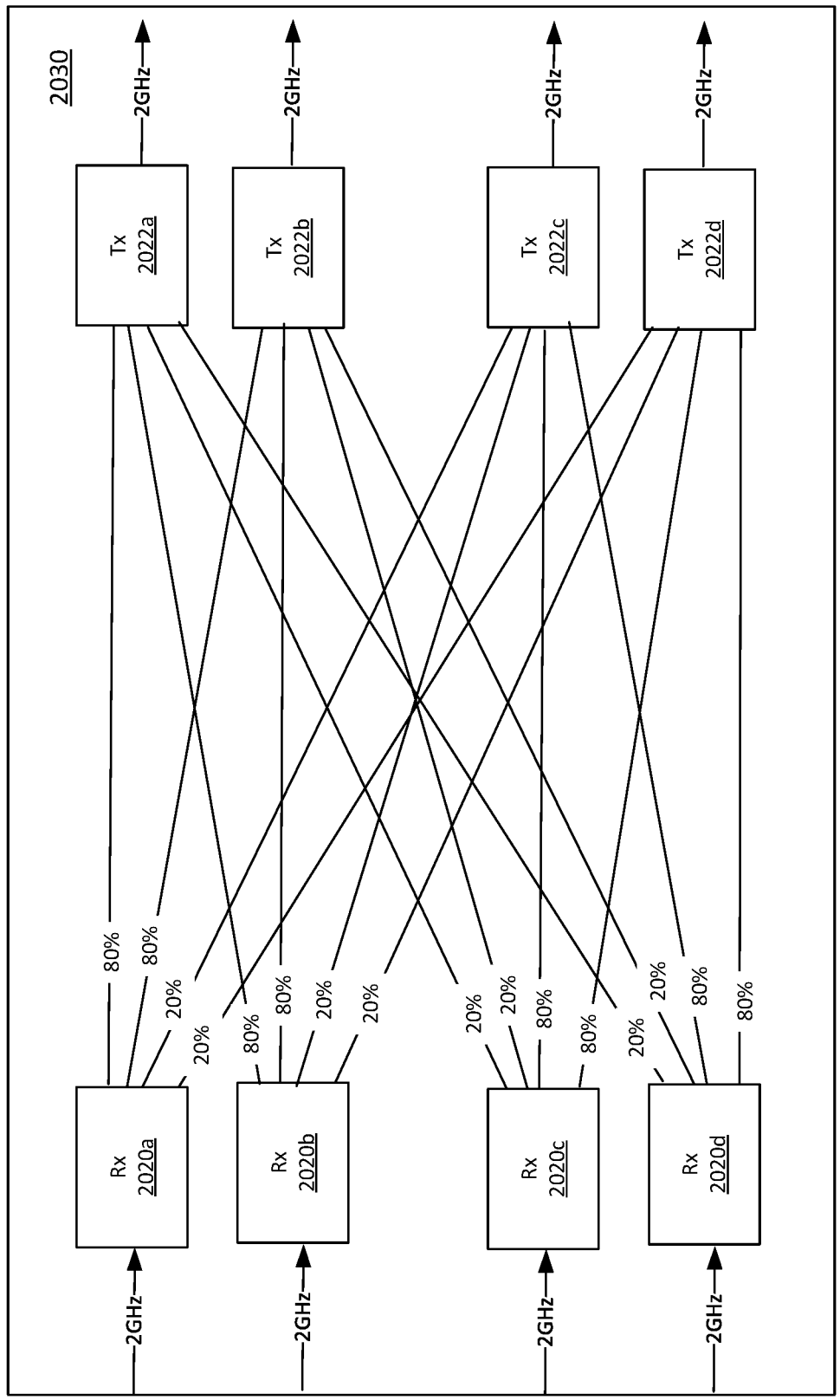

FIG. 20D illustrates a block 2030 that includes receive modules 2020a-d and transmit modules 2022a-d that are connected without intervening switch modules. Receive module 2020a and transmit module 2022a are configured so that 80% of data output by receive module 2020a goes to transmit module 2022a where the splitting is in terms of subchannels (frequency). Receive module 2020b is a spare for receive module 2020a and is also configured to send 80% of its output data to transmit module 2022a. Identical outputs, representing 80% of output data from receive module 2020a and 2020b, are provided to spare transmit module 2022b. In addition, 20% of data output from receive module 2020a (and 20% from spare receive module 2020b) are sent to transmit module 2022c (and to spare module 2022d), which is configured to replace transmit module 2022c in case of failure). Similarly, receive module 2020c (and corresponding spare receive module 2020d) are configured to send 80% of their outputs to transmit module 2022c (and corresponding spare transmit module 2022d) and to send 20% of their output to transmit module 2022a (and corresponding spare transmit module 2022b). Thus, like the arrangement of FIG. 20B, there are two receive modules and two transmit modules, each with spares. However, while all output from a given receive module was directed to a corresponding transmit module in FIG. 20B, here output is split between different transmit modules, with 80% going to one transmit module and 20% going to another transmit module. Thus, while the receive/transmit module pairs of blocks 2010 and 2012 of FIG. 20B operate independently, receive/transmit module pairs in FIG. 20D account for 80% of data with the remaining 20% exchanged between pairs (e.g. receive module 2020a provides 80% of its output to transmit module 2022a, which thus may be considered a receive/transmit pair, similarly, receive module 2020c and transmit module 2022c may be considered a pair, and 20% of output is swapped between these pairs). While the 80/20 split of FIG. 20D is used for illustration, it will be understood that output may be allocated in any suitable manner between receive modules and transmit modules using a fixed allocation scheme that does not require switch modules. Such an arrangement may be used to configure receive modules and transmit modules of a satellite (e.g. receive modules coupled to receiver elements such as antennas and transmit modules coupled to transmit elements such as spot beam antennas or phased array elements). All receive modules and transmit modules of a satellite may be configured in this manner, or a portion may be configured in this manner, with additional receive modules and transmit modules connected by switch modules (e.g. connected as illustrated above in FIG. 11.

Figure 21:
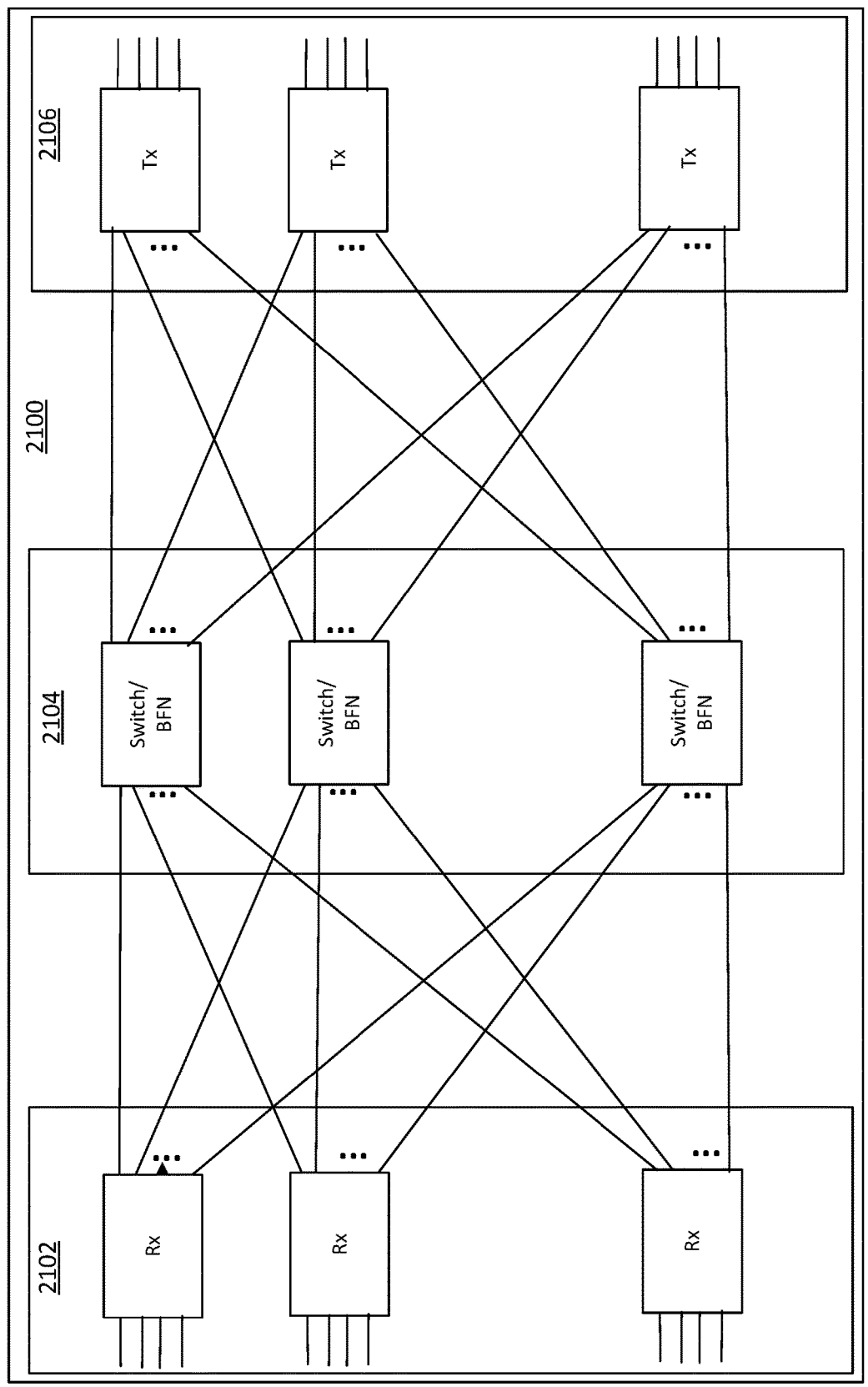
FIG. 21 illustrates an example of a channelizer data path.

FIG. 21 shows an example of a channelizer 2100 that includes a receive stage 2102 that includes a configurable number of receive circuits (Rx), a switching stage 2104 that includes a configurable number of beamforming switch circuits (Switch/BFN), and a transmit stage 2106 that includes a configurable number of transmit circuits (Tx). Each stage is modular and can be reconfigured by adding modules or removing modules. For example, receive stage 2102 may be reconfigured by adding or removing receive circuits (receive modules), switching stage 2104 may be reconfigured by adding or removing switch circuits (switch modules), and transmit stage 2106 may be reconfigured by adding or removing transmit circuits (transmit modules).

Switching and beamforming tables implementing a switching and/or beamforming scheme may be configured according to the numbers of modules in each stage, and according to the configurations of the modules.

An example of a channelizer includes: a plurality of receive circuits, an individual receive circuit including a frequency demultiplexer that is configured to demultiplex a plurality of subchannels and a time-division demultiplexer coupled to the frequency demultiplexer, the time-division demultiplexer configured to time-division demultiplex the plurality of subchannels to provide a plurality of time-division outputs, an individual time-division output of the plurality of time-division outputs including portions of data from each of the plurality of subchannels; and a plurality of switch circuits, each of the plurality of switch circuits configured to receive a different time-division output of the plurality of time-division outputs from the individual receive circuit.

The plurality of time-division outputs may individually correspond to a plurality of distinct sample periods such that each of the plurality of time-division outputs may include a portion of data from each of the plurality of subchannels from an individual sample period assigned to the individual time-division output. Each of the plurality of time-division outputs from the individual receive circuit may correspond to a different distinct sample period, with distinct sample periods of the plurality of time-division outputs repeated in a cycle. An individual switch circuit of the plurality of switch circuits may be configured to receive the individual time-division output and is further configured to receive time-division outputs from each other receiver circuit of the plurality of receiver circuits from the individual sample period. The individual switch circuit may be configured to apply a matrix operator on portions of data from each subchannel of each of the plurality of receiver circuits for the individual sample period to generate a plurality of switched time-division outputs for the individual sample period. Each of the plurality of switch circuits may be configured to apply a matrix operator on portions of data from each subchannel of each of the plurality of receiver circuits for a different distinct sample period of the plurality of distinct sample periods. The channelizer may further include a plurality of transmit circuits coupled to the plurality of switch circuits, an individual transmit circuit including a time-division multiplexer configured to time-division multiplex switched time-division outputs from the plurality of switch circuits. The individual transmit circuit may further include a frequency multiplexer coupled to receive output from the time-division multiplexer and to generate a frequency multiplexed output. The frequency demultiplexer may be configured to demultiplex a first number of subchannels and the plurality of switch circuits may be configured to apply a matrix operator only on portions of data from a second number of subchannels that is a subset of the first number of subchannels, where the second number of subchannels is less than the first number of subchannels. The plurality of switch circuits may be configured to apply a matrix operator on portions of data from the plurality of receive circuits according to routing tables to implement a non-blocking beamforming scheme. The channelizer may include a direct connection between a receive circuit and a transmit circuit, the direct connection configured to provide output data from the receive circuit to the transmit circuit without passing through a switch circuit.

An example of an apparatus includes: a frequency demultiplexing stage configured to demultiplex a plurality of input subchannels; a time-division demultiplexing stage connected to the frequency demultiplexing stage, the time-division demultiplexing stage configured to time-division demultiplex the plurality of input subchannels by sample period and to provide a plurality of time-division demultiplexed outputs corresponding to a plurality of sample periods; a switching stage coupled to receive the plurality of time-division demultiplexed outputs from the time-division demultiplexing stage, the switching stage including a plurality of switch circuits that are individually assigned to the plurality of sample periods such that an individual switching stage applies a matrix operator on the plurality of input subchannels for an individual sample period; a time-division multiplexing stage configured to time-division multiplex inputs from the plurality of switch circuits to form a plurality of output subchannels; and a frequency multiplexing stage configured to frequency multiplex the plurality of output subchannels.

The apparatus may further include: a plurality of receiver elements connected to provide an input to the frequency demultiplexing stage; and a plurality of transmitter elements connected to receive an output from the frequency multiplexing stage. The plurality of transmitter elements may be spot beam antennas and the apparatus may further include switching and beamforming tables configured to implement a beam hopping scheme. The plurality of transmitter elements may be phased array elements and the apparatus may further include switching and beamforming tables configured to implement a beamforming scheme. The plurality of receiver elements may be spot beam antennas or phased array elements and the apparatus may further include switching and beamforming tables configured to implement a beamforming scheme. An individual switch circuit may apply a matrix operator on the plurality of input subchannels according to switching and beamforming tables for the individual sample period. The apparatus may further include a first plurality of amplifiers between the plurality of receiver elements and the frequency demultiplexing stage and a second plurality of amplifiers between the frequency multiplexing stage and the plurality of transmitter elements.

An example of a system includes: a gateway; a plurality of subscriber terminals; and a satellite configured for communication with the gateway via an uplink and configured for communication with the plurality of subscriber terminals via a downlink, the satellite including a plurality of receive circuits that are coupled to a plurality of transmit circuits through a plurality of switch circuits, each receive circuit having a time-division demultiplexer to provide time-division outputs to the plurality of switch circuits according to sample period, and each switch circuit configured to apply a matrix operator on a different sample period.

The satellite may further include a plurality of transmit elements and the plurality of switch circuits may be configured to provide outputs to the plurality of transmit elements according to a beamforming scheme. The satellite may further include a plurality of spot beam antennas and the plurality of switch circuits may be configured to provide outputs to the plurality of spot beam antennas according to a beam hopping scheme.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

The invention claimed is:

1. An apparatus comprising:
a switching stage for use in a channelizer, the switching stage comprising a plurality of switch circuits that are individually assigned to a plurality of sample periods such that an individual switch circuit applies a matrix operator on a plurality of time-division dempultiplexed input subchannels for an individual sample period, wherein the switching stage is configured to:
receive the plurality of time-division demultiplexed input subchannels, input subchannels of the plurality of time-division demultiplexed input subchannels having been frequency demultiplexed from an input prior to time-division demultiplexing;
at each respective one of the plurality of switch circuits, apply the matrix operator to received time-division demultiplexed input subchannel data for the individual sample period to obtain a plurality of switched time-division outputs for the individual sample period; and
output the plurality of switch time-division outputs for the plurality of sample periods.

2. The apparatus of claim 1, wherein an individual switch circuit of the plurality of switch circuits is configured to receive a first time-division demultiplexed output from a first receive circuit and at least one other time-division demultiplexed output from at least one other receive circuit, wherein the first time-division demultiplexed output and the at least one other time-division demultiplexed output are from the same individual sample period.

3. The apparatus of claim 1, wherein an individual time-division demultiplexed input subchannel of the plurality of time-division demultiplexed input subchannels includes portions of data from each of the input subchannels.

4. The apparatus of claim 1, further comprising a switching table configured to implement a beam hopping scheme using a plurality of spot beam antennas.

5. The apparatus of claim 1, further comprising switching and beamforming tables configured to implement a beamforming scheme using a plurality of phased array elements.

6. The apparatus of claim 1, wherein the plurality of time-division demultiplexed input subchannels individually correspond to the plurality of sample periods such that each of the plurality of time-division demultiplexed input subchannels includes a portion of data from each of the plurality of input subchannels from an individual sample period assigned to the individual time-division demultiplexed input subchannel.

7. The apparatus of claim 1, further comprising a digital channelizer system which assigns processing of different receive beamforming sub-bands and transmit beamforming sub-bands to different ones of the plurality of switch circuits.

8. A system comprising:
a gateway;
a plurality of subscriber terminals; and
a satellite configured for communication with the gateway via an uplink and configured for communication with the plurality of subscriber terminals via a downlink, the satellite including a plurality of switch circuits coupled to a plurality of receive circuits and a plurality of transmit circuits, each switch circuit configured to receive a plurality of time-division outputs that have been time-division demultiplexed according to sample period and apply a matrix operator on a different sample period.

9. The system of claim 8, wherein an individual switch circuit of the plurality of switch circuits is configured to receive a first time-division output from a first receive circuit and at least one other time-division output from at least one other receive circuit, wherein the first time division output and the at least one other time division output are from the same individual sample period.

10. The system of claim 8, wherein the plurality of switch circuits are configured to provide outputs to a plurality of transmitter elements according to a beamforming scheme.

11. The system of claim 10, wherein the plurality of transmitter elements are phased array elements and wherein the satellite further comprises switching and beamforming tables configured to implement the beamforming scheme.

12. The system of claim 8, wherein the satellite further includes a plurality of receiver elements connected to provide an input to the plurality of receive circuits.

13. The system of claim 12, wherein the plurality of receiver elements are spot beam antennas and wherein the satellite further comprises a switching table configured to implement a beam hopping scheme.

14. The system of 33, wherein the plurality of receiver elements are phased array elements and wherein the satellite further comprises switching and beamforming tables configured to implement a beamforming scheme.

15. The system of claim 8, wherein processing of different receive and transmit beamforming sub-bands are assigned to different ones of the plurality of switch circuits.

16. The system of claim 8, wherein input subchannels are mapped to output subchannels in a one-to-many mapping scheme.

17. The system of claim 8, further comprising a receiver element array connected to the plurality of receive circuits, the receiver element array configured to enhance a received signal using a beamforming technique.

18. The system of claim 8, wherein the satellite further comprises a memory storing additional routing tables, the additional routing tables including routing for one or more hopping periods other than a current hopping period.

19. The system of claim 8, wherein each receive circuit comprises a frequency demultiplexer configured to demultiplex a first number of subchannels and the plurality of switch circuits are configured to apply the matrix operator only on portions of data from a second number of subchannels that is a subset of the first number of subchannels, where the second number of subchannels is less than the first number of subchannels.

\* \* \* \* \*

UNITED STATES PATENT AND TRADEMARK OFFICE
CERTIFICATE OF CORRECTION

| | |
|---|---|
| PATENT NO. | : 11,888,578 B2 |
| APPLICATION NO. | : 17/890701 |
| DATED | : January 30, 2024 |
| INVENTOR(S) | : Oliver Labrèche, Michel Thériault and Pierre Talbot |

It is certified that error appears in the above-identified patent and that said Letters Patent is hereby corrected as shown below:

In the Claims

Claim 14, Column 28, Line 54:
"The system of 33,"
Should read:
-- The system of claim 12, --

Signed and Sealed this
Sixth Day of August, 2024

Katherine Kelly Vidal
*Director of the United States Patent and Trademark Office*